(12) United States Patent
Yamasaki et al.

(10) Patent No.: US 9,473,885 B2
(45) Date of Patent: Oct. 18, 2016

(54) FLEET MANAGEMENT SERVER, ONBOARD TERMINAL EQUIPMENT, AND FLEET MANAGEMENT SYSTEM

(71) Applicant: Hitachi Construction Machinery Co., Ltd., Tokyo (JP)

(72) Inventors: Ryota Yamasaki, Tokyo (JP); Tsutomu Yamada, Tokyo (JP); Yoshinori Ookura, Tokyo (JP); Tomoyuki Hamada, Tsuchiura (JP); Hidefumi Ishimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/623,685

(22) Filed: Feb. 17, 2015

(65) Prior Publication Data

US 2015/0276416 A1    Oct. 1, 2015

(30) Foreign Application Priority Data

Mar. 27, 2014   (JP) ................... 2014-066882

(51) Int. Cl.
| | |
|---|---|
| H04L 29/06 | (2006.01) |
| H04W 4/02 | (2009.01) |
| H04W 4/04 | (2009.01) |
| G08G 1/00 | (2006.01) |

(52) U.S. Cl.
CPC ............ *H04W 4/021* (2013.01); *G08G 1/20* (2013.01); *H04W 4/028* (2013.01); *H04W 4/046* (2013.01)

(58) Field of Classification Search
CPC ..... G01C 21/34; H04W 4/028; H04W 4/046; H04W 4/021
USPC ........................................ 701/537
See application file for complete search history.

(56) References Cited

U.S. PATENT DOCUMENTS

| | | | |
|---|---|---|---|
| 5,586,030 A | 12/1996 | Kemner et al. | |
| 2015/0206355 A1* | 7/2015 | Hubbard | G01S 19/13 701/1 |

FOREIGN PATENT DOCUMENTS

JP    2009-061892    3/2009

* cited by examiner

Primary Examiner — Anne Antonucci
(74) Attorney, Agent, or Firm — Mattingly & Malur, PC

(57) ABSTRACT

A fleet management server is connected to onboard terminal equipments mounted on plural haulage vehicles. The server includes an operation mode determination unit and operation mode switching unit. The determination unit determines whether or not an operation mode, in which segment setting processing is performed to set travel-permitted segments for the vehicles, respectively, needs switching between a bidirectional mode and a push mode. In the bidirectional mode, the processing is performed to send response information upon reception of request information from each onboard terminal equipment. In the push mode, a travel-permitted segment setting unit, without reception of such request information, performs the processing for one of the vehicles to set a new travel-permitted segment, and produces and transmits travel permission information indicating the new travel-permitted segment. The switching unit performs switching processing of the operation mode according to the results of the determination.

8 Claims, 14 Drawing Sheets

FIG. 4

| KINDS OF MESSAGES | COMMUNICATION DIRECTIONS |
|---|---|
| REQUEST INFORMATION | ONBOARD TERMINAL EQUIPMENT →FLEET MANAGEMENT SERVER |
| TRAVEL PERMISSION INFORMATION | FLEET MANAGEMENT SERVER →ONBOARD TERMINAL EQUIPMENT |
| TRAVEL NON-PERMISSION INFORMATION | FLEET MANAGEMENT SERVER →ONBOARD TERMINAL EQUIPMENT |
| STOP NOTICE INFORMATION | ONBOARD TERMINAL EQUIPMENT →FLEET MANAGEMENT SERVER |
| SWITCH-TO-BIDIRECTIONAL-MODE INFORMATION | FLEET MANAGEMENT SERVER →ONBOARD TERMINAL EQUIPMENT |
| SWITCH-TO-PUSH-MODE INFORMATION | FLEET MANAGEMENT SERVER →ONBOARD TERMINAL EQUIPMENT |
| OPERATION MODE SWITCH INFORMATION | FLEET MANAGEMENT SERVER →ONBOARD TERMINAL EQUIPMENT |

FIG. 9

| DUMP TRUCK IDENTIFICATION INFORMATION (901) | TRAVEL-PERMITTED SEGMENT | | STOP FLAG (904) | CONGESTION FLAG (905) |
|---|---|---|---|---|
| | FRONT BOUNDARY POINT (902) | REAR BOUNDARY POINT (903) | | |
| 1 | 702 | 703 | 1 | 0 |
| 2 | 703 | 704 | 1 | 1 |
| 3 | 704 | 705 | 1 | 1 |
| 4 | 705 | 706 | 0 | 0 |

1) ITEM 2 IS DISSATISFIED (●)AS THE DUMP TRUCK 0 IS TRAVELING IN FIG. 7

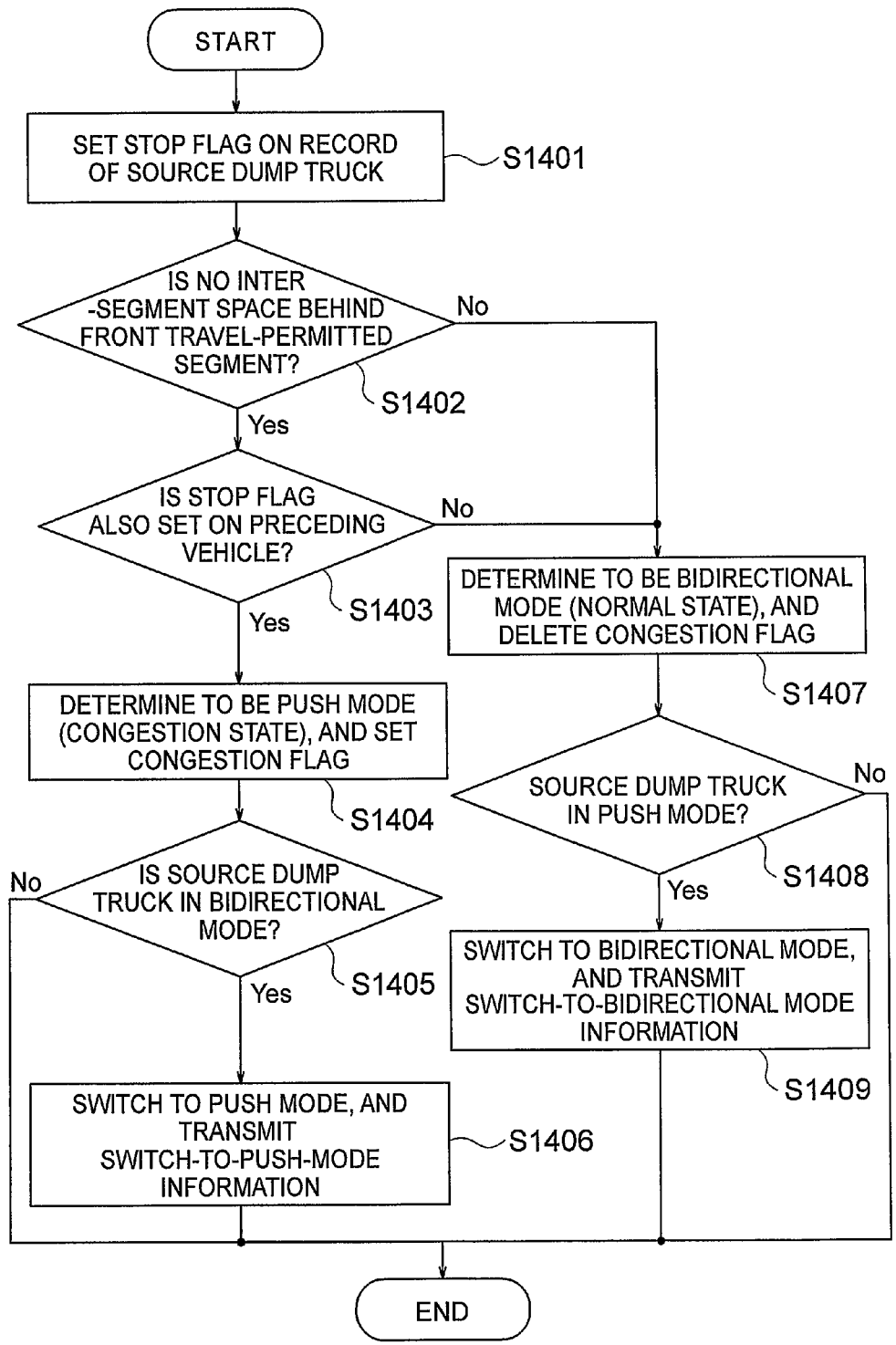

FLEET MANAGEMENT SERVER, ONBOARD TERMINAL EQUIPMENT, AND FLEET MANAGEMENT SYSTEM

CROSS-REFERENCE TO RELATED APPLICATION

This application claims the priority of Japanese Patent Application 2014-066882 filed Mar. 27, 2014, which is incorporated herein by reference.

BACKGROUND OF THE INVENTION

1. Field of the Invention

This invention relates to a fleet management server, onboard terminal equipments and a fleet management system for mining haulage vehicles, and specifically to a reduction in the amount of wireless communications to be used in fleet management.

2. Description of the Related Art

As a control method for mining haulage vehicles, so-called "blocking control" that divides a travel route for the individual haulage vehicles into plural travel segments and permits only one of the haulage vehicles to travel in each travel segment may be performed (see JP-A-2009-61892).

On the other hand, mining haulage vehicles are loaded at a loading site with earth, sand and/or ore (hereinafter collectively called "rock") from a loading machine such as a wheel loader or hydraulic excavator. Until loading work is completed for a vehicle ahead of one's own vehicle, however, the own vehicle stops and waits before the loading site. According to a fleet management system that relies upon blocking control as a premise, the stop of the front vehicle for its turn to access the loading site, therefore, prevents the own vehicle, which is located behind the front vehicle, from entering a travel segment allocated to the front vehicle so that the own vehicle needs to stop at a position rear of the travel segment. As a result, plural haulage vehicles may form a queue for waiting their turn before the loading site.

As an illustrative control method for the queue of the stopped haulage vehicles, U.S. Pat. No. 5,586,030 is known. U.S. Pat. No. 5,586,030 discloses an autonomous traveling vehicle system that, when the most forward position in a queue is vacated in a first-in, first-out manner, allows the rear vehicles to move to new positions sequentially.

According to the autonomous traveling vehicle system of U.S. Pat. No. 5,586,030, request signals that request next stop positions are transmitted to the server sequentially, first from the frontmost haulage vehicle. The transmission of these request signals is conducted even in a situation that the frontmost vehicle is at stop. A situation, therefore, arises in which the server cannot instruct the next stop positions in response to the request signals. Because the request signals at this time are transmitted to the server although they are unnecessary wireless communications from the viewpoint of forward movements of the haulage vehicles, the autonomous traveling vehicle system of U.S. Pat. No. 5,586,030 involves a problem in that such necessary request signals induce an increase in the amount of communications at a wireless communication base station and also an increase in the processing load on the server.

With the foregoing circumstances in view, the present invention has, as objects thereof, the provision of a fleet management server, onboard terminal equipments and a fleet management system, which can perform fleet management while suppressing the occurrence of unnecessary wireless communications that do not contribute to forward movements of haulage vehicles.

SUMMARY OF THE INVENTION

To solve the above-described problem, the present invention provides, in one aspect thereof, a fleet management server connected, via a wireless communication network, to onboard terminal equipments mounted respectively on plural haulage vehicles, which travel along a predetermined travel route in a mine, to perform fleet management of the plural haulage vehicles. The fleet management server comprises a server-side communication control unit configured to perform control of wireless communications to be conducted with the individual onboard terminal equipments, a travel-permitted segment setting unit configured to perform segment setting processing for setting segments on the travel route as travel-permitted segments, in which the individual haulage vehicles are permitted to travel, for the plural haulage vehicles, respectively, an operation mode determination unit configured to determine, based on state information of each haulage vehicle, whether or not an operation mode of the fleet management server and the corresponding onboard terminal equipment needs switching upon performing the segment setting processing, and configured to determine whether or not switching of the operation mode from one of a bidirectional mode, in which upon reception by the server-side communication control unit of request information transmitted from the onboard terminal equipment and indicating a request for the setting of the travel-permitted segment, the travel-permitted segment setting unit performs the segment setting processing with respect to the haulage vehicle with the onboard terminal equipment mounted thereon and production of response information indicating results of the segment setting processing, and the response information is transmitted from the server-side communication control unit, and a push mode, in which without reception of the request information, the travel-permitted segment setting unit performs the segment setting processing with respect to the haulage vehicle subjected to the determination to set a new travel-permitted segment, performs production of travel permission information indicating the new travel-permitted segment, and transmits the travel permission information from the server-side communication control unit, to the other is needed, and an operation mode switching unit configured to perform, according to results of the determination, switching processing of the operation mode for the onboard terminal equipment mounted on the haulage vehicle subjected to the determination and also for the travel-permitted segment setting unit.

According to the state information of each haulage vehicle, the operation mode determination unit determines whether or not the operation mode of segment setting processing for the haulage vehicle should be switched to the bidirectional mode or the push mode, and the operation mode switching unit performs switching processing to the operation mode according the results of the determination for the travel-permitted segment setting unit and the haulage vehicle. Depending on the state of each haulage vehicle, a situation may arise in which the haulage vehicle cannot move forward despite transmission of request information and no new travel-permitted segment is set. Under such a situation, the application of the push mode makes it possible to alleviate problems that would otherwise arise by the transmission of request information, which does not contribute to a forward movement, from the haulage vehicle, for example, to reduce an increase in the amount of communications and an increase in the load on the fleet management server for responding to such request information.

In the above-described configuration, the operation mode switching unit may preferably be configured, upon switching from the bidirectional mode to the push mode, to transmit transmission stop instructions with respect to the request information to the onboard terminal equipment mounted on the haulage vehicle subjected to the determination and to cause the travel-permitted segment setting unit to start the performance of the segment setting processing with respect to the haulage vehicle subjected to the determination, and upon switching from the push mode to the bidirectional mode, to transmit transmission stop cancellation instructions with respect to the request information to the onboard terminal equipment mounted on the haulage vehicle subjected to the determination and to instruct the travel-permitted segment setting unit to start the performance of the segment setting processing with respect to the haulage vehicle subjected to the determination after reception of the request information from the haulage vehicle.

As the operation mode switching unit transmits transmission stop instructions with respect to the request information upon switching from the push mode to the bidirectional mode, it is possible to perform segment setting processing while reducing the transmission of unnecessary request information from the side of the haulage vehicle in the push mode. Upon switching to the bidirectional mode, on the other hand, it is possible to perform segment setting processing at the timing of output of request information from the side of the haulage vehicle by transmitting transmission stop cancellation instructions with respect to the request information. This makes it possible to perform segment setting processing while reducing the transmission and reception of unnecessary request information.

In the above-described configuration, the operation mode determination unit may preferably be configured to determine switching of the operation mode of the travel-permitted segment setting unit from the bidirectional mode to the push mode when among the plural haulage vehicles, the haulage vehicle subjected to the determination and the immediately preceding haulage vehicle located immediately ahead of the haulage vehicle subjected to the determination are both at stop and a travel-permitted segment set for the haulage vehicle subjected to the determination and another travel-permitted segment set for the immediately preceding haulage vehicle are adjacent to each other.

When consecutive two haulage vehicles are both at stop and travel-permitted segments allocated to these haulage vehicles are adjacent to each other, in other words, there is no inter-segment space between the consecutive travel-permitted segments, the following one of the consecutive two haulage vehicles is in a situation that it cannot move forward. Under such a situation, it is possible to prevent the following haulage vehicle from transmitting request information, which does not contribute to a forward movement, by changing the operation mode of segment setting processing for the following haulage vehicle to the push mode.

In the above-described configuration, the operation mode determination unit may preferably be configured to determine switching of the operation mode of the segment setting processing for the haulage vehicle, which is subjected to the determination, from the push mode to the bidirectional mode when the immediately preceding haulage vehicle has started traveling while the haulage vehicle subjected to the determination has been set in the push mode and is traveling or when a distance, which enables to set a new travel-permitted segment between the travel-permitted segment set for the haulage vehicle subjected to the determination and the travel-permitted segment set for the immediately preceding haulage vehicle, has arisen while the haulage vehicle subjected to the determination has been set in the push mode and is traveling.

When the immediately preceding haulage vehicle has started traveling or when an inter-segment space has arisen behind the travel-permitted segment for the immediately preceding haulage vehicle during traveling of the haulage truck subjected to the determination, a situation arises in which the haulage vehicle subjected to the determination can move forward. When the operation mode determination unit determines to switch from the push mode to the bidirectional mode in the above-described situation, the transmission of request information from the haulage vehicle subjected to the determination makes it possible to perform segment setting processing corresponding to a change in the position of the haulage vehicle after the haulage vehicle subjected to the determination starts traveling.

In the above-described configuration, the operation mode determination unit may preferably be configured to produce operation mode management information with determination result information, which indicates results of the determination with respect to the individual plural haulage vehicles, being stored therein in association with haulage vehicle identification information that specifically identify the individual haulage vehicles, and the operation mode switching unit may preferably configured to perform the switching processing of the operation mode with reference to the operation mode management information.

According to the above-described configuration, the operation mode switching unit can perform the switching of the operation mode according to the state of each haulage vehicle by referring to the operation mode management information.

In another aspect, the present invention provides an onboard terminal equipment connected, via a wireless communication network, to a fleet management server configured to perform fleet management processing for plural haulage vehicles which travel along a predetermined travel route in a mine. The onboard terminal equipment comprises a terminal-side communication control unit configured to perform control of wireless communications to be conducted with the fleet management server, and a request information processing unit configured to perform transmission instructions with respect to request information for requesting setting of a travel-permitted segment as a segment in the travel route, in which traveling of the haulage vehicle with the onboard terminal equipment mounted thereon is permitted, to stop transmission processing of the request information when the terminal-side communication control unit receives transmission stop instructions with respect to the request information from the fleet management server, and to start transmission instruction processing of the request information when the terminal-side communication control unit receives transmission stop cancel instructions with respect to the request information from the fleet management server.

According to the above-described configuration, the fleet management server determines, by referring to the state of the haulage vehicle with the onboard terminal equipment mounted thereon, whether or not request information can be transmitted. Upon reception of transmission stop instructions with respect to the request information from the operation fleet server, the transmission of the request information from the onboard terminal equipment stops. Upon reception of transmission stop cancellation instructions with respect to the request information from the fleet management server, the transmission of the request information from the onboard terminal equipment is resumed. This reduces the transmission of unnecessary request information from the onboard terminal equipment, because each request information is transmitted from the onboard terminal equipment according to an instruction from the fleet management server.

In a further aspect, the present invention provides a fleet management system including a fleet management server configured to perform fleet management of plural haulage vehicles, which travel along a predetermined travel route in a mine, and onboard terminal equipments connected, via a wireless communication network, to the fleet management server and mounted respectively on the plural haulage vehicles. The fleet management server comprises a server-side communication control unit configured to perform control of wireless communications to be conducted with the individual onboard terminal equipments, a travel-permitted segment setting unit configured to perform segment setting processing for setting segments on the travel route as travel-permitted segments, in which the individual haulage vehicles are permitted to travel, for the plural haulage vehicles, respectively, an operation mode determination unit configured to determine, based on state information of each haulage vehicle, whether or not an operation mode of the fleet management server and the corresponding onboard terminal equipment needs switching upon performing the segment setting processing, and configured to determine whether or not switching of the operation mode from one of a bidirectional mode, in which upon reception by the server-side communication control unit of request information transmitted from the onboard terminal equipment and indicating a request for the setting of the travel-permitted segment, the travel-permitted segment setting unit performs the segment setting processing with respect to the haulage vehicle with the onboard terminal equipment mounted thereon and production of response information indicating results of the segment setting processing, and the response information is transmitted from the server-side communication control unit, and a push mode, in which without reception of the request information, the travel-permitted segment setting unit performs the segment setting processing with respect to the haulage vehicle subjected to the determination to set a new travel-permitted segment, performs production of travel permission information indicating the new travel-permitted segment, and transmits the travel permission information from the server-side communication control unit, to the other is needed, and an operation mode switching unit configured to perform, according to results of the determination, switching processing of the operation mode for the onboard terminal equipment mounted on the haulage vehicle subjected to the determination and also for the travel-permitted segment setting unit. The onboard terminal equipments each comprise a terminal-side communication control unit configured to perform control of wireless communications to be conducted with the fleet management server, and a request information processing unit configured to perform transmission instructions with respect to request information for requesting setting of a travel-permitted segment as a segment in the travel route, in which traveling of the haulage vehicle with the onboard terminal equipment mounted thereon is permitted, to stop transmission processing of the request information when the terminal-side communication control unit receives transmission stop instructions with respect to the request information from the fleet management server, and to start transmission instruction processing of the request information when the terminal-side communication control unit receives transmission stop cancel instructions with respect to the request information from the fleet management server.

According to the state information of each haulage vehicle, the operation mode determination unit determines whether or not the operation mode of the travel-permitted segment setting unit for the haulage vehicle should be switched to the bidirectional mode or the push mode, and the operation mode switching unit performs switching processing to the operation mode according the results of the determination for the travel-permitted segment setting unit and the haulage vehicle. Depending on the state of each haulage vehicle, a situation may, therefore, arise in which the haulage vehicle cannot move forward despite transmission of request information and no new travel-permitted segment is set. Under such a situation, the application of the push mode makes it possible to alleviate problems that would otherwise arise by the transmission of request information, which does not contribute to a forward movement, from the haulage vehicle, for example, to reduce an increase in the amount of communications and an increase in the load on the fleet management server for responding to such request information.

According to the present invention, it is possible to provide a fleet management server, onboard terminal equipments and a fleet management system, which can perform fleet management while suppressing the occurrence of unnecessary wireless communications that do not contribute to forward movements of own mining haulage vehicles even under a situation that these vehicles are waiting in a queue. Problems, configurations and advantageous effects other than those described above will become apparent from the following description of an embodiment.

BRIEF DESCRIPTION OF THE DRAWINGS

FIG. 4 is a diagram illustrating the kinds of messages to be transmitted and received between the fleet management server and the onboard terminal equipment, and the directions of their communications.

FIGS. 5A to 5C are diagrams illustrating the configurations of information formats to be transmitted and received between the fleet management server and each dump truck, in which FIG. 5A illustrates a format of request information to be transmitted from the dump truck to the fleet management server, FIG. 5B illustrates a format of travel permission information to be transmitted from the fleet management server to the dump truck, and FIG. 5C is a format of operation mode switching information to be transmitted from the fleet management server to the dump truck.

FIGS. 6A and 6B are diagrams depicting a bidirectional mode, in which FIG. 6A depicts the timing of transmission of request information, and FIG. 6B depicts a vacated segment.

FIGS. 8A and 8B are diagrams illustrating the amount of communications in the bidirectional mode and that in the push mode in comparison to each other, in which FIG. 8A illustrates the amount of communications when transmitted in the bidirectional mode under a congestion state, and FIG. 8B illustrates the amount of communications when transmitted in the bidirectional mode under a congestion state.

FIG. 9 is a fleet management information table illustrating the travel states of the dump trucks in FIG. 7.

FIG. 14 is a flow chart illustrating a detailed flow of operation mode determination processing.

DETAILED DESCRIPTION OF PREFERRED EMBODIMENT

Figure 1:
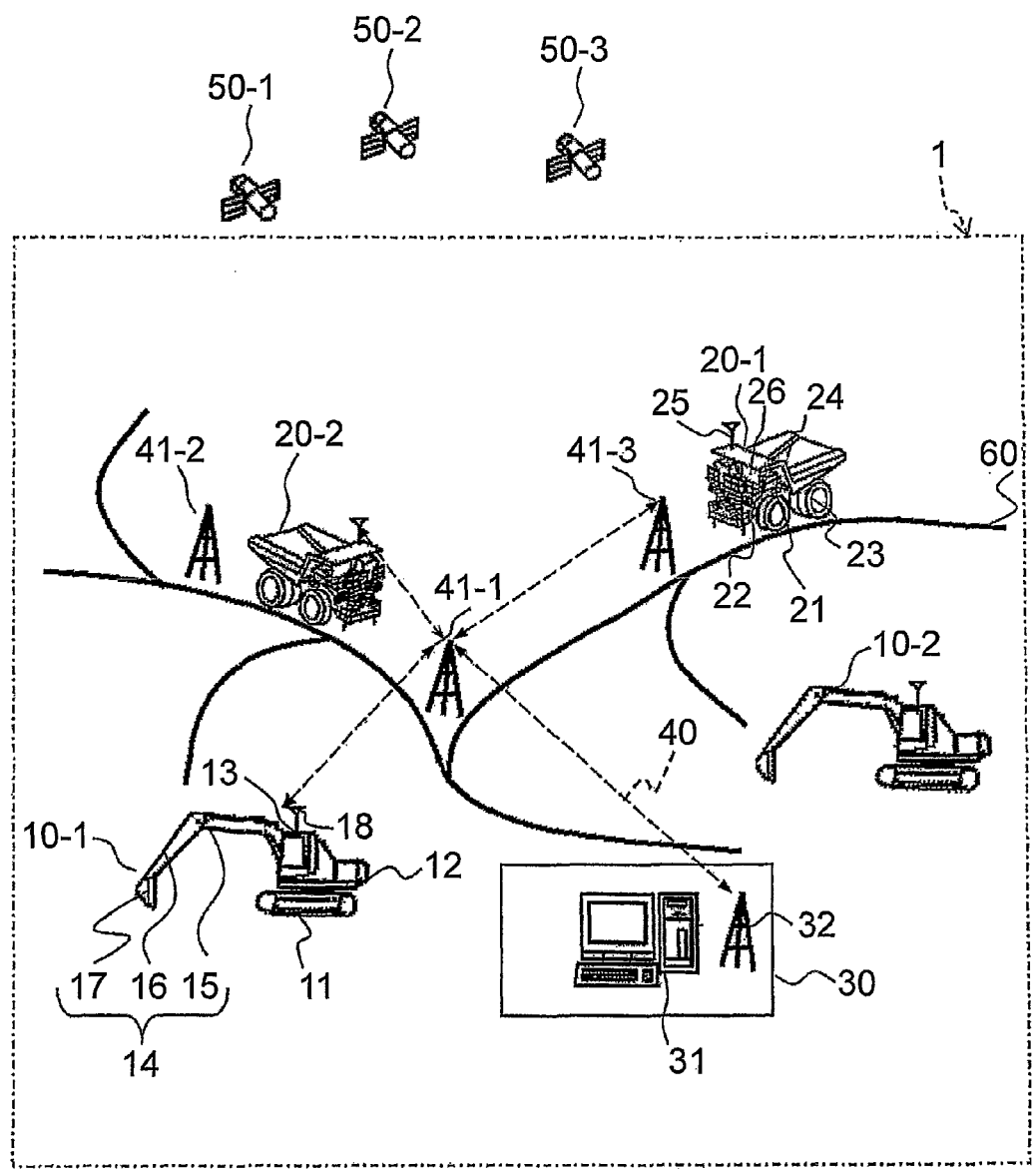
FIG. 1 is a diagram illustrating the schematic configuration of a fleet management system according to an embodiment of the present invention.

In the following embodiment, the embodiment will be described by dividing it in plural sections or embodiments wherever such division is needed for the sake of convenience. When a reference is made to the number of elements (how many of elements) or the like (e.g., numerical value, amount, range or the like) in the following embodiment, the description shall not be limited to the specific number, but may be equally applied to a number greater or smaller than the specific number unless specifically indicated or the number of the elements is evidently limited, in principle, to the specific number. It is also to be noted that in the following embodiment, its constituent elements, including processing steps and the like, are not absolutely essential unless specifically indicated or the number of the elements is evidently considered to be essential in principle.

Further, the individual configurations, functions, processing units, processing means and the like in the following embodiment may be partly or wholly realized, for example, as integrated circuits or other hardware. Alternatively, the individual configurations, functions, processing units, processing means and the like, which will be mentioned subsequently herein, may be realized as programs to be executed on a computer or computers. Information, such as programs, tables and files, which realize such individual configurations, functions, processing units, processing means and the like, can be stored in storage devices such as memories, hard disks and/or SSD (Solid State Drive), and/or storage media such as IC cards, SD cards and/or DVD.

The embodiment of the present invention will hereinafter described in detail with reference to the drawings. It is to be noted that in all the figures for describing the embodiment, members having the same function are identified by the same or similar reference numeral and repeated descriptions of them are omitted. It is also to be noted that in the following embodiment, the description of the same or similar part is not repeated unless specifically needed.

[System Configuration]

The first embodiment relates to a fleet management system that haulage vehicles, which haul rock loaded by a loading machine such as an excavator or wheel loader in a mine, and a fleet management server, which manages the fleet of the haulage vehicles, are connected together via a wireless communication network, and is characterized in the operation mode of each haulage vehicle and the fleet management server is switched especially based on the travel state of the haulage vehicle. With reference to the drawings, a description will hereinafter be made about the fleet management system according to the first embodiment of the present invention.

First, the schematic configuration of the fleet management system according to the first embodiment will be described with reference to FIG. 1. FIG. 1 is a diagram illustrating the schematic configuration of the fleet management system according to this embodiment. The fleet management system 1 illustrated in FIG. 1 includes excavators 10-1,10-2 that perform loading work of rock at a quarry such as a mine (hereinafter typically called "mine"), onboard terminal equipments 26 mounted on dump trucks 20-1,20-2 that haul loaded material such as rock, and the fleet management server 31 installed at a control center 30 near to or remote from the mine.

Each dump truck 20-1 or 20-2 plies to and from the excavator 10-1 or 10-2 and an unillustrated dumping site along travel route 60 set beforehand in the mine, and hauls the material loaded thereon. This embodiment will be described taking, as an example, unmanned dump trucks that autonomously travel without riding of operators thereon, but the present invention can also be applied to manned dump trucks on which operators ride to operate.

The excavators 10-1,10-2, dump trucks 20-1,20-2, and fleet management server 31 are connected one another for wireless communications via wireless communication lines 40. To perform such wireless communication connections smoothly, plural wireless base stations 41-1,41-2,41-3 are built in the mine. The radio waves of such wireless communications are transmitted and received via these base stations.

The excavators 10-1,10-1 and dump trucks 20-1,20-2 are provided with position calculation systems (their illustration is omitted in FIG. 1), each of which receives positioning radio waves from at least three navigation satellites 50-1, 50-2, 50-3 of a global navigation satellite system (GNSS) to acquire the position of the own vehicle. As the GNSS, GPS (Global, Positioning System), GLONASS (Global Navigation Satellite System) or GALILEO may be used, for example. A description will hereinafter be made about the excavators 10-1, 10-2 and dump trucks 20-1, 20-2. The excavators 10-1,10-2 have the same configuration, and so the dump trucks 20-1, 20-2. Therefore, a description will be made about the excavator 10-1 and dump truck 20-1, while a description will be omitted about the excavator 10-2 and dump truck 20-2.

The excavator 10-1 is a super jumbo hydraulic excavator, and is constructed with a travel base 11, a revolving upperstructure 12 swingably mounted on the travel base 11, a cab 13, and a front working mechanism 14 arranged at a center of a front section of the revolving upperstructure 12. The front working mechanism 14 includes a boom 15 arranged raisably and lowerably relative to the revolving upper structure 12, an arm 16 arranged pivotally on a free end of the boom 15, and a bucket 17 attached to a free end of the arm 16. An antenna 18 is installed for connection with the wireless communication lines 40 at a location of good visibility on the excavator 10-1, for example, on an upper part of the cab 13.

The dump truck 20-1 includes a frame 21 that forms a main body, front wheels 22 and rear wheels 23, a body 24 pivotal in an up-and-down direction about hinge pins (not illustrated) arranged as a center of pivotal motion on a rear part of the frame 21, and a pair of left and right hoist cylinders (not illustrated) that cause the body 24 to pivot in the up-and-down direction. In addition, an antenna 25 is installed for connection with the wireless communication lines 40 at a location of good visibility, for example, on a front part of a top wall of the dump truck 20-1.

On the dump truck 20-1, on the other hand, the onboard terminal equipment 26 is mounted for autonomous traveling according to instructions from the fleet management server 31.

The fleet management server 31 is connected to an antenna 32 for its connection to the wireless communication lines 40. The fleet management server 31 then communicates with the excavators 10-1,10-2 and dump trucks 20-1, 20-2, respectively, via the antenna 32 and wireless base stations 41-1,41-2,41-3.

Figure 2:
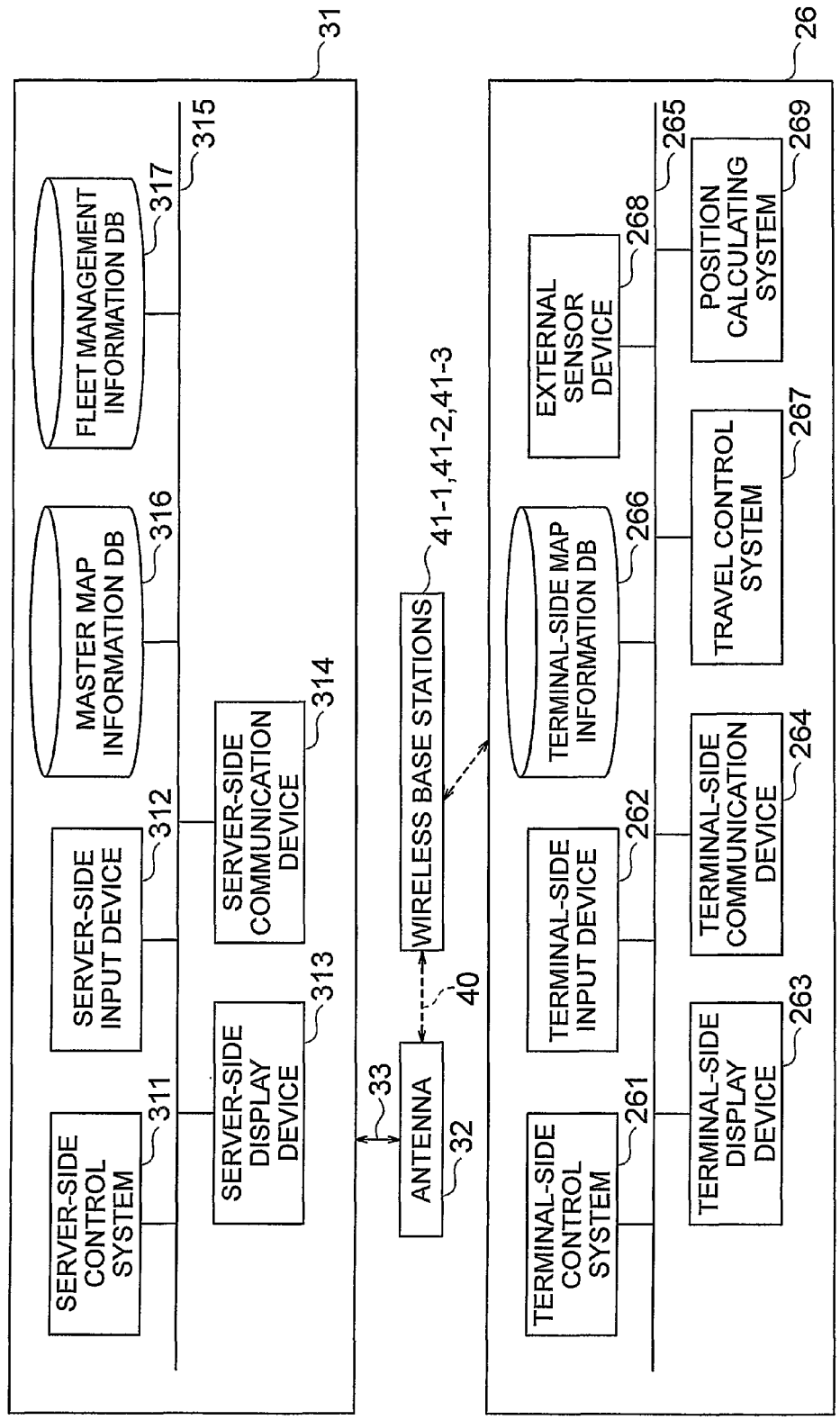
FIG. 2 is a hardware configuration diagram of a fleet management server and an onboard terminal equipment.

Referring next to FIG. 2, a description will be made about the hardware configurations of the fleet management server 31 and onboard terminal equipment 26 of FIG. 1.

FIG. 2 is a hardware configuration diagram of the fleet management server and onboard terminal equipment.

As illustrated in FIG. 2, the fleet management server 31 is configured including a server-side control system 311, a server-side input device 312, a server-side display device 313, a server-side communication system 314, a communication bus 315, a master map information database ("database" will hereinafter be abbreviated as "DB") 316, and a fleet management information DB 317.

The server-side control system 311 serves to control operations of the individual constituent elements of the fleet management server 31, and is configured using a hardware system. This hardware system includes, in addition to an arithmetic and control unit such as CPU (Central Processing Unit), storage devices such as ROM (Read Only Memory) and HDD (Hard Disk Drive), which store programs to be executed at the fleet management server 31, and RAM (Random Access Memory) which serves as a working area when the CPU executes one or more of the programs. The functional configurations of the programs to be executed at the fleet management server 31 will be described subsequently herein with reference to FIG. 3.

The server-side input device 312 is configured of an input device such as a mouse or keyboard, and functions as an interface that accepts input operations from an operator.

The server-side display device 313 is configured of a liquid crystal monitor or the like, and functions as an interface that displays and provides information to the operator.

The server-side communication system 314 is configured by a system that performs communication connections with wire/wireless networks. The fleet management server 31 is connected to the antenna 32 via wire communication lines 33, and is connected to the wireless base stations 41-1,41-2,41-3 via the wireless communication lines 40. As the wireless communication system, one of high versatility, such as a wireless communication system conforming to the standards of Wi-Fi (Wireless Fidelity) or IEEE (Institute of Electrical and Electronics Engineers) 802.11, may be employed.

The communication bus 315 electrically connects the individual constituent elements one another.

The master map information DB 361 is configured using a storage device, such as HDD, that stores information in a non-volatile form, and stores travel course information defined by position information on individual points (hereinafter called "nodes") on the travel route 60 and sublinks connecting the individual nodes. In addition, the master map information DB 316 may also contain terrain information on the mine and the absolute coordinates (three-dimensional real coordinates calculated based on positioning radio waves) of the individual nodes. To each node, position identification information (hereinafter called "node ID") that specifically identifies this node has been assigned.

The fleet management information DB 317 is configured using a storage device, such as HDD, that stores information in a non-volatile form, and stores fleet management information for the dump trucks including dump truck ID (that corresponds to haulage identification information), which specifically identify the individual dump trucks, and travel state information, which identify the current positions, travel speeds and travelling/at stop of the individual dump trucks. In this embodiment, information, which indicates the operation modes of segment setting processing for setting travel-permitted segments according to the state information of the individual dump trucks, is also stored in the fleet management information DB 317 in addition to the fleet management information. In this embodiment, information (that is equivalent to the determination result information indicating the results of determination of the operation modes), which indicates the state information of the individual dump trucks and the operation modes of the segment setting processing for the individual dump trucks, is managed using a single table. This table will hereinafter be called "operation mode management table". In this embodiment, the operation mode management table is used. However, the form of storage of the result of determination of the operation modes is not limited to such a table format, but any format may be used insofar as the identification information on the dump trucks and the above-described determination result information are associated with each other as the information (operation mode management information).

The above-described databases may each be provided with only a storage unit that stores the master map information and fleet management information, and the server-side control system 311 may perform the updating and retrieval processing of these databases. Alternatively, the databases may each include an engine that performs the updating and retrieval processing of information of the above-described individual DB.

The onboard terminal equipment 26 mounted on the dump truck 20-1 is configured including a terminal-side control system 261, a terminal-side input device 262, a terminal-side display device 263, a terminal-side communication system 264, a communication bus 265, a terminal-side map information DB 266, a travel control system 267, an external sensor device 268, and a position calculating system 269.

The terminal-side control system 261 serves to control operations of the individual constituent elements of the onboard terminal equipment 26, and is configured using a hardware system. This hardware system includes, in addition to an arithmetic and control unit such as CPU, storage devices such as ROM and HDD, which store programs to be executed at the onboard terminal equipment 26, and RAM which serve as a working area when the CPU executes one or more of the programs. As an alternative, the terminal-side control system 261 may be configured using an integrated circuit (ASIC: Application Specific Integrated Circuit) for realizing the functions to be executed at the onboard terminal equipment 26. The functional configurations of the programs to be executed at the onboard terminal equipment 26 will be described subsequently herein with reference to FIG. 3.

The terminal-side input device 262 is configured of an input device such as a touch panel or various switches, and functions as an interface that accepts input operations from an operator of the dump truck 20-1.

The terminal-side display device 263 is configured of a liquid crystal monitor or the like, and functions as an interface that displays and provides information to the operator.

As the terminal-side communication system 264, a wireless communication system such as a wireless communication system of high versatility conforming to the standards of Wi-Fi or IEEE 802.11 may also be employed.

The communication bus 265 electrically connects the individual constituent elements one another.

The terminal-side map information DB 266 is configured using a storage device, such as HDD, that stores information in a non-volatile form, and stores the same map information as that stored in the master map information DB 316.

The travel control system 267 is a control system, which instructs an amount of acceleration or deceleration, an amount of braking and a steering angle to drive systems (hereinafter called "travel drive systems") that relate to the traveling of the dump truck 20-1, such as an acceleration/deceleration system, brake system, steering system and the like of the dump truck 20-1.

The external sensor device 268 is a sensor, such as a millimeter-wave radar or forward camera, which detects a front obstacle in the traveling direction (advancing direction) of the dump truck 20-1, and no limitation is imposed on its kind. The results of detection by the external sensor device 268 are outputted to the travel control system 267, are used for the monitoring of a travel position to avoid departure from the travel route and also for an acceleration or deceleration in a normal time and in the event of an emergency, is used for a braking operation needed in an emergency invasive maneuver.

The position calculation system 269 calculates the current position of the own vehicle based on positioning radio waves from the navigation satellites 50-1,50-2,50-3 (see FIG. 1). The calculated current position of the own vehicle is transmitted from the terminal-side communication device 264 to the fleet management server 31.

Figure 3:
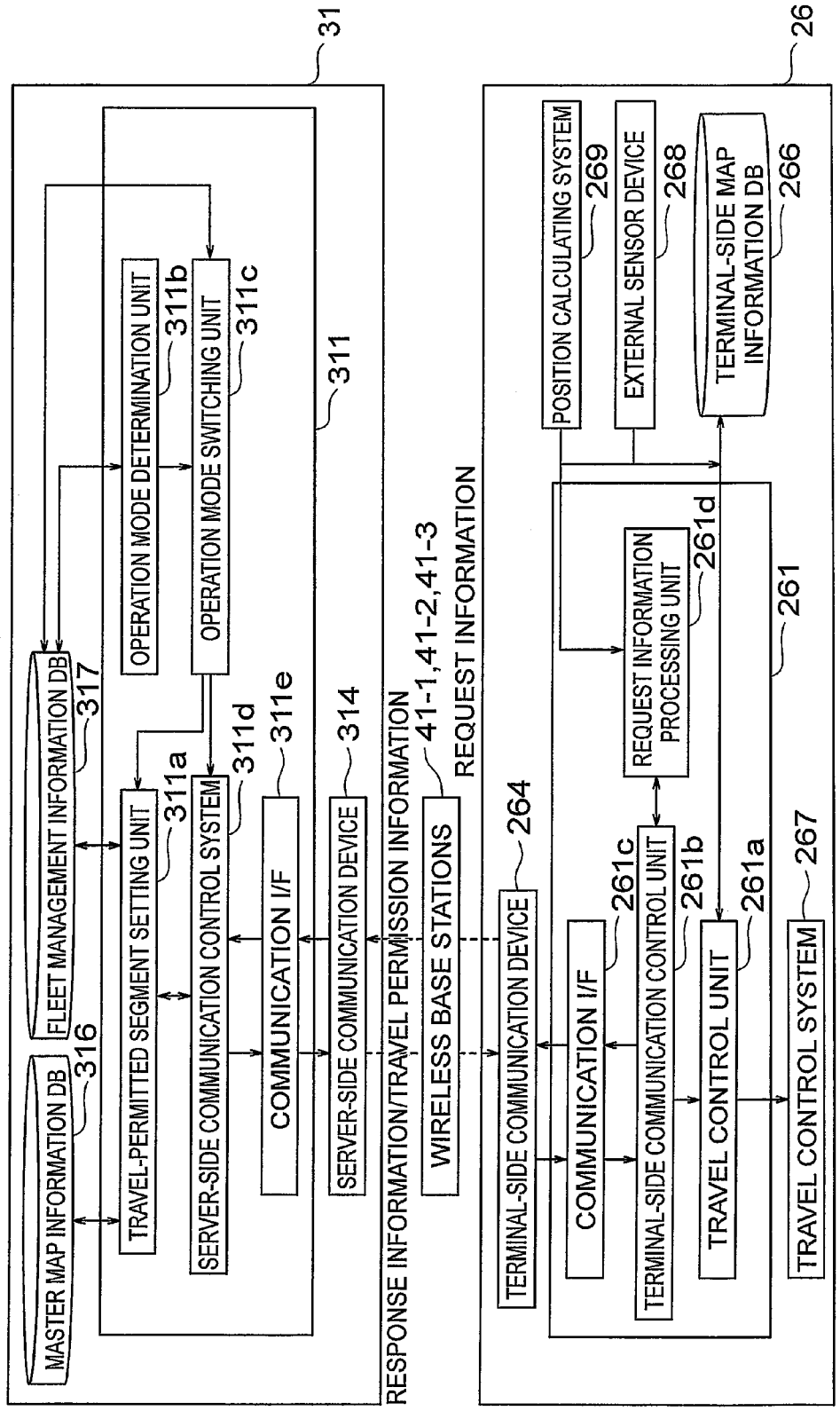
FIG. 3 is a functional block diagram illustrating main functions of the fleet management server and onboard terminal equipment.

Referring next to FIG. 3, a description will be made about the functional configuration of the fleet management server 31 and onboard terminal equipment 26 of FIG. 1. FIG. 3 is a functional block diagram illustrating main functions of the fleet management server and onboard terminal equipment.

As illustrated in FIG. 3, the server-side control system 311 of the fleet management server 31 is provided with a travel-permitted segment setting unit 311a, an operation mode determination unit 311b, an operation mode switching unit 311c, a server-side communication control unit 311d, and a communication interface (hereinafter abbreviated as "communication I/F") 311e.

The travel-permitted segment setting unit 311a performs segment setting processing, which based on the map information in the master map information DB 316, the fleet management information DB 317 and the position information transmitted respectively from the plural dump trucks, sets for each dump truck a segment on the travel route as a travel-permitted segment in which the dump truck is permitted to travel. The travel-permitted segment setting unit 311a sets the travel-permitted segment by setting a front boundary point at a point forward of the current position of the dump truck 20-1 on the travel route 60 and also setting a rear boundary point at a point that is the current position of the dump truck 20-1 or forward of the current position but is rearward of the front boundary point in the traveling direction.

The operation mode determination unit 311b ascertains the state information of each dump truck with reference to the operation mode management information stored in the fleet management information DB 317, and based on the state of the dump truck, determines whether or not switching of the operation mode is needed when the travel-permitted segment setting unit 311a performs segment setting processing. Described specifically, the operation mode determination unit 311b determines which one of the bidirectional mode and the push mode should be applied as the operation mode of the segment setting processing for each dump truck.

Now, the term "bidirectional mode" means an operation mode that, when the server-side communication control unit 311d receives request information transmitted from the onboard terminal equipment 26 and indicating a request for at least one travel-permitted segment, the travel-permitted segment setting unit 311a performs the production of response information indicating the performance of segment setting processing for the dump truck 20-1 with the onboard terminal equipment 26 mounted thereon and its results, and transmits the response information from the server-side communication control unit 311d.

On the other hand, the term "push mode" means an operation mode that without reception of request information, the travel-permitted segment setting unit 311a performs segment setting processing for the dump truck to set a new travel-permitted segment, produces travel permission information indicating the new travel-permitted segment, and transmits the travel permission information from the server-side communication control unit 311d.

The operation mode determination unit 311b determines to switch the operation mode of travel-permitted segment setting unit 311a from the bidirectional mode to the push mode when of the plural dump trucks, the dump truck subjected to the determination and the immediately preceding dump truck located immediately forward of the dump truck are both at stop and the travel-permitted segment set for the dump truck subjected to the determination and that set for the immediately preceding dump truck are adjacent to each other.

The operation mode determination unit 311b determines to switch the operation mode of the segment setting processing for the dump truck 20-1 from the push mode to the bidirectional mode when the immediately preceding dump truck has started traveling while the dump truck 20-1 subjected to the determination has been set in the push mode and is traveling or when a distance, which enables to set a new travel-permitted segment between the travel-permitted segment set for the dump truck 20-1 and the travel-permitted segment set for the immediately preceding dump truck, has arisen while the dump truck 20-1 has been set in the push mode and is traveling.

The operation mode determination unit 311b performs the determination of the operation mode of the segment setting processing with respect to each of the plural dump trucks, and writes determination result information, which indicates the results of the determination, in the operation mode management information.

With respect to the dump truck 20-1 subjected to the determination and the travel-permitted segment setting unit 311a, the operation mode switching unit 311c performs switching processing of the operation mode according to the results of the determination. Described specifically, upon switching from the bidirectional mode to the push mode, the operation mode switching unit 311*c* transmits transmission stop instructions with respect to the request information to the dump truck 20-1 subjected to the determination, and at the same time, causes the travel-permitted segment setting unit 311*a* to start the performance of the segment setting processing with respect to the dump truck 20-1 subjected to the determination. Upon switching from the push mode to the bidirectional mode, on the other hand, the operation mode switching unit 311*c* transmits transmission stop cancellation instructions with respect to the request information to the dump truck 20-1 subjected to the determination, and at the same time, instructs the travel-permitted segment setting unit 311*a* to receive the request information from the dump truck 20-1, to use the reception as a trigger to start the segment setting processing with respect to the dump truck 20-1 subjected to the determination, and to perform the production of response information indicating the results of the segment setting processing.

Upon performing the switching processing of the operation mode, the operation mode switching unit 311*c* refers to the operation mode management information stored in the fleet management information DB 317.

The server-side communication control unit 311*d* performs the control of radio communications conducted with the onboard terminal equipment 26. For example, the server-side communication control unit 311*d* receives request information from each dump truck, and performs control that response information produced according to the request information and travel permission information produced under the push mode are transmitted.

The communication I/F 311*e* is configured of a hardware system, such as a connection terminal or the like of the USB (Universal Serial Bus) standards, that performs communication connections with the server-side communication device 314.

A description will next be made about the onboard terminal equipment 26. The terminal-side control system 261 of the onboard terminal equipment 26 is provided with a drive control unit 261*a*, a terminal-side communication control unit 261*b*, a communication I/F 261*c*, and a request information processing unit 261*d*.

The travel control unit 261*a* acquires the current position of the own vehicle from the position calculating system 269, and with reference to the map information of the terminal-side map information DB 266, performs control on the travel control system 267 to cause the own vehicle to travel according to the response information or the travel-permitted segment contained in the travel permission information. Further, the travel control unit 261*a* also determines the presence or absence of a front obstacle based on the results of detection by the external sensor device 268, also determines a need or no need of an evasive maneuver from an interference with or a collision against the obstacle, and if necessary, performs control for a braking operation.

The terminal-side communication control unit 261*b* performs control of wireless communications to be conducted with the fleet management server 31. For example, the terminal-side communication control unit 261*b* transmits, to the fleet management server 31, request information to request a next travel-permitted segment, and performs control to receive response information or travel permission information from the fleet management server 31.

The communication I/F 261*c* is configured of a hardware system useful for conducting communication connections with the terminal-side communication device 264 such as a connection terminal or the like of the USB standard.

The request information processing unit 261*d* performs, to the terminal-side communication control unit 261*b*, instructions for transmission of request information to request the setting of a travel-permitted segment that is a segment, in which travel is permitted for the dump truck 20-1 with the onboard terminal equipment 26 mounted thereon, on the travel route. The request information processing unit 261*d* stops the processing of the instructions for the transmission of the request information when the terminal-side communication control unit 261*b* receives transmission stop instructions for the request information from the fleet management server 31, but resumes the processing of the instructions for the transmission of the request information when the terminal-side communication control unit 261*b* receives instructions for cancellation of the transmission stop for the request information from the fleet management server 31.

The above-described individual functions, which the fleet management server 31 is equipped with, are realized when the programs for realizing these functions are performed by the server-side control system 311 illustrated in FIG. 2. Similarly, the above-described individual functions, which the onboard terminal equipment 26 is equipped with, are realized when the programs for realizing these functions are performed by the terminal-side control system 261 illustrated in FIG. 2.

With reference to FIG. 4, a description will be made about messages to be transmitted and received between the fleet management server 31 and the onboard terminal equipment 26 mounted on the dump truck 20-1. FIG. 4 is a diagram illustrating the kinds of the messages to be transmitted and received between the fleet management server 31 and the onboard terminal equipment 26, and the directions of their communications.

The "request information" shown in FIG. 4 is a message, which the onboard terminal equipment 26 transmits and the fleet management server 31 receives and which the onboard terminal equipment 26 requests to acquire a next travel-permitted segment.

The "travel permission information" is a message, which the fleet management server 31 transmits and the onboard terminal equipment 26 receives and which indicates a new travel-permitted segment when the allocation of the new travel-permitted segment is feasible. The travel permission information is produced as a result of the performance of segment setting processing by the travel-permitted segment setting unit 311*a* based on the request information from the onboard terminal equipment 26 in the bidirectional mode or as a result of the performance of segment setting processing by the travel-permitted segment setting unit 311*a* without performing the reception of the request information in the push mode.

The "travel non-permission information" is a message, which the fleet management server 31 transmits and the onboard terminal equipment 26 receives when the next travel permission segment cannot be allocated in the bidirectional mode. In the bidirectional mode, travel permission information or travel non-permission information is produced and transmitted in response to the request information. This travel permission information or travel non-permission information, therefore, corresponds to the response information to the request information.

The "stop notice information" is a message, which the onboard terminal equipment 26 transmits and the fleet management server 31 receives and which is noticed from the onboard terminal equipment 26 to the fleet management server 31 when the dump truck 20-1 with the onboard terminal equipment 26 mounted thereon has reached a stop point with the onboard terminal equipment 26 being still unable to obtain the next travel-permitted segment.

The "switch-to-bidirectional-mode information" is information, which the fleet management server 31 transmits to the onboard terminal equipment 26 and which includes instructions for switching the operation mode of the onboard terminal equipment 26 from the push mode to the bidirectional mode. For example, the "switch-to-bidirectional-mode information" may include a cancellation signal for the stop of the transmission of request information to the request information processing unit 261*d*.

The "switch-to-push-mode information" is information, which the fleet management server 31 transmits to the onboard terminal equipment 26 and which includes instructions for switching the operation mode of the onboard terminal equipment 26 from the bidirectional mode to the push mode. For example, the "switch-to-push-mode information" may include an instruction signal for the stop of the transmission of request information to the request information processing unit 261*d*.

In this embodiment, only the two modes, i.e., the bidirectional mode and the push mode, are available as operation modes, and one of them is used alternatively. It is, therefore, possible to use, in place of the above-described set of "switch-to-bidirectional-mode information" and "switch-to-push-mode information", "operation mode switch information" that performs instructions to switch from the current operation mode to the other operation mode when the operation mode determination unit 311*b* determines to switch the operation mode. By exchanging the above-described 6 kinds or 5 kinds of messages, all the processing according to this embodiment can be realized.

Figure 5A:
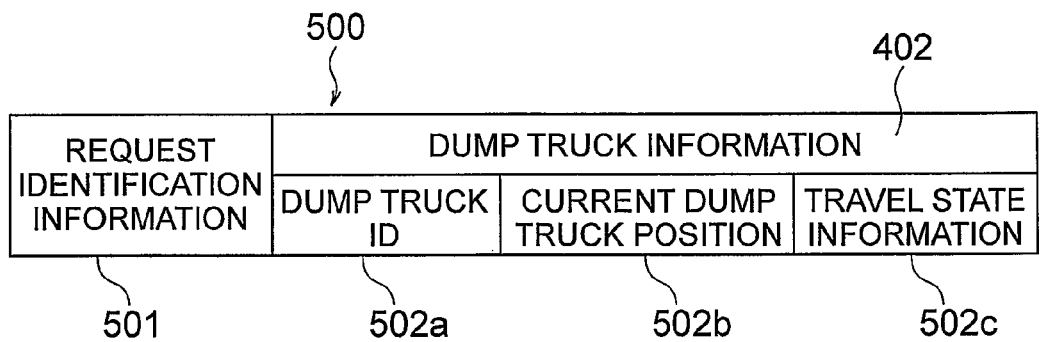
Figure 5B:
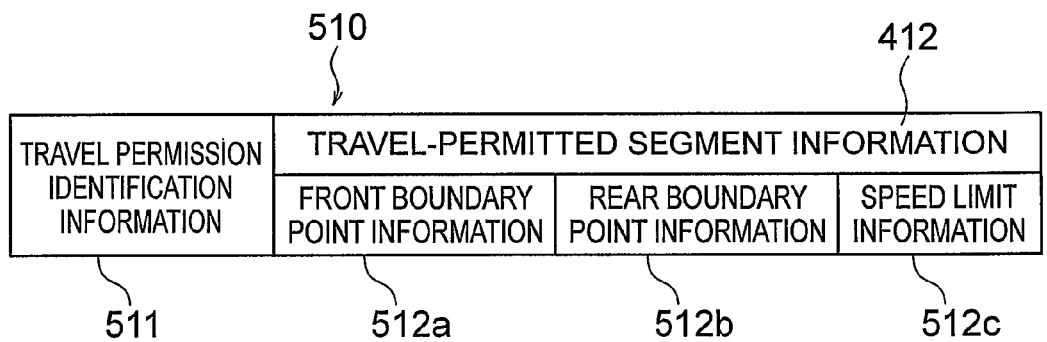
Figure 5C:
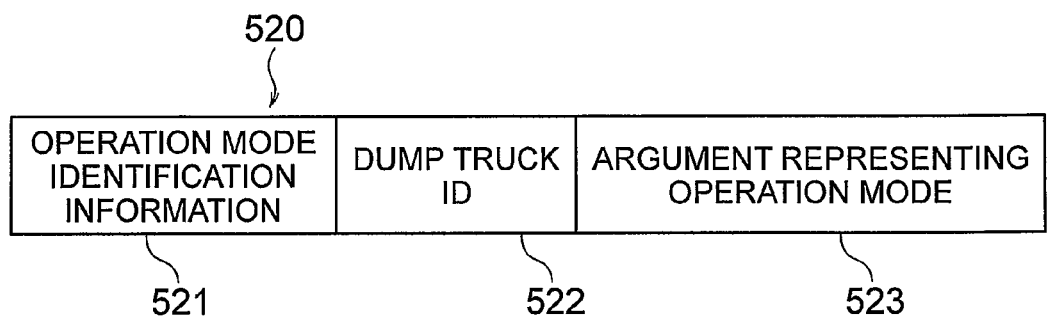

Referring next to FIGS. 5A to 5C, a description will be made about the processing of wireless communications between the fleet management server and each autonomous traveling dump truck. FIGS. 5A to 5C are diagrams illustrating the configurations of information formats to be transmitted and received between the fleet management server and the dump truck, in which FIG. 5A illustrates a format of request information to be transmitted from the dump truck to the fleet management server, FIG. 5B illustrates a format of travel permission information to be transmitted from the fleet management server to the dump truck, and FIG. 5C is a format of operation mode switching information to be transmitted from the fleet management server to the dump truck.

As illustrated in FIG. 5A, a request information format 500 includes request identification information 501 for specifically identifying the request information, and dump truck information 502 indicating the state of the dump truck that has transmitted the request information. The dump truck information 502 includes a dump truck ID 502*a* specifically identifying the dump truck that has transmitted the request, current dump truck position information 502*b* indicating the current position of the dump truck as calculated based on positioning radio waves, and travel state information 502*c* indicating the travel state, such as the traveling speed (which indicates the distinction of at stop or traveling) and tire pressure, of the dump truck.

As illustrated in FIG. 5B, a travel permission information format 510 includes travel permission identification information 511 for specifically identifying the travel permission information, and travel-permitted segment information 512 indicating information on a newly-set travel permission segment. In the bidirectional mode, the travel permission identification information 511 uses information that can uniquely identify to which request information it is responding. In the push mode, on the other hand, it is possible to use a dump truck ID, which is intended to uniquely identify a source dump truck, for indicating for which dump truck the travel permission information is. Even when broadcast transmitted from the fleet management server 31 via the wireless communication lines 40, each dump truck can, therefore, receive travel permission information and determine whether or not it is travel permission information for the own vehicle. This determination may be performed based on an MAC address (Media Access Control address) and an IP address (Internet Protocol address), which are contained in a wireless communication by the terminal-side communication device 264, communication I/F 261*c* and terminal-side communication control unit 261*b* of the onboard terminal equipment 26 mounted on the own vehicle.

The travel-permitted segment information 512 includes front boundary point information 512*a*, rear boundary point information 512*b*, and speed limit information 512*c*. The speed limit information 512*c* indicates "at stop" when the value of the speed limit information 512 is 0, but indicates "traveling" when the value of the speed limit information 512 is greater than 0.

As illustrated in FIG. 5C, an operation mode information format 520 includes "operation mode identification information" 521 for specifically identifying operation mode information, "dump truck ID" 522 for uniquely specifying a receiver dump truck, and an "argument representing an operation mode" 523 indicating to which one of the bidirectional mode and the push mode the operation mode should be switched. The "argument representing an operation mode" 523 beforehand sets, for example, the bidirectional mode as "1", the push mode as "2", and "3" as an argument that indicates only switching. If "1" is set in the argument 523, the operation mode information format 520 can be used as a format for transmitting the switch to-bidirectional-mode information. Similarly, if "2" is set in the argument 523, the operation mode information format 520 can be used as a format for transmitting the switch to-push-mode information. If "3" is set in the argument 523, the operation mode information format 520 can be used as a format for instructing switching of the operation mode.

[Processing and Advantageous Effects]

The fleet management system according to this embodiment is characterized in that it performs fleet management by selectively using the bidirectional mode—in which request information is transmitted from the onboard terminal equipment 26 mounted on the dump truck 20-1 to the fleet management server 31 and in response to this request information, the fleet management server 31 transmits travel permission information indicating a next travel-permitted segment or travel non-permission information—or the push mode—in which without transmitting request information from the dump truck 20-1, travel permission information is forcibly transmitted from the fleet management server 31 to the onboard terminal equipment 26.

The above-described bidirectional mode and push mode are concepts of operation mode, which are distinguished from each other by the presence or absence of transmission of request information from the onboard terminal equipment 26 to the fleet management server 31 and are concepts totally different from the bidirectional communication (for example, the half-duplex communication system or the full duplex communication system) and the unidirectional communication system as wireless communication technologies. Therefore, even if the half-duplex communication system or the full duplex communication system is used as a wireless communication technology, no transmission and reception of request information are performed between the fleet management server 31 and the onboard terminal equipment 26, and the operation mode that forcibly transmits travel permission information from the fleet management server 31 corresponds to the push mode in this embodiment.

Figure 6A:
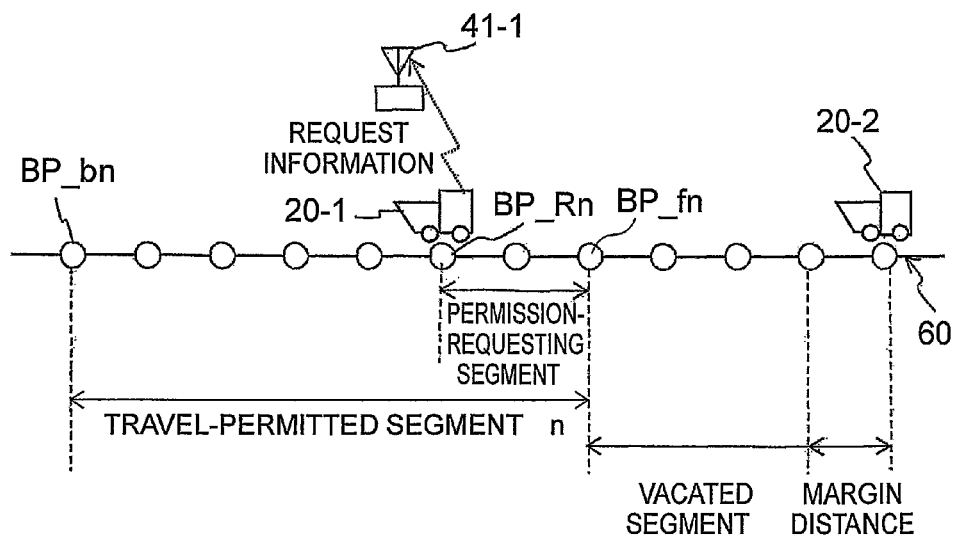
Figure 6B:
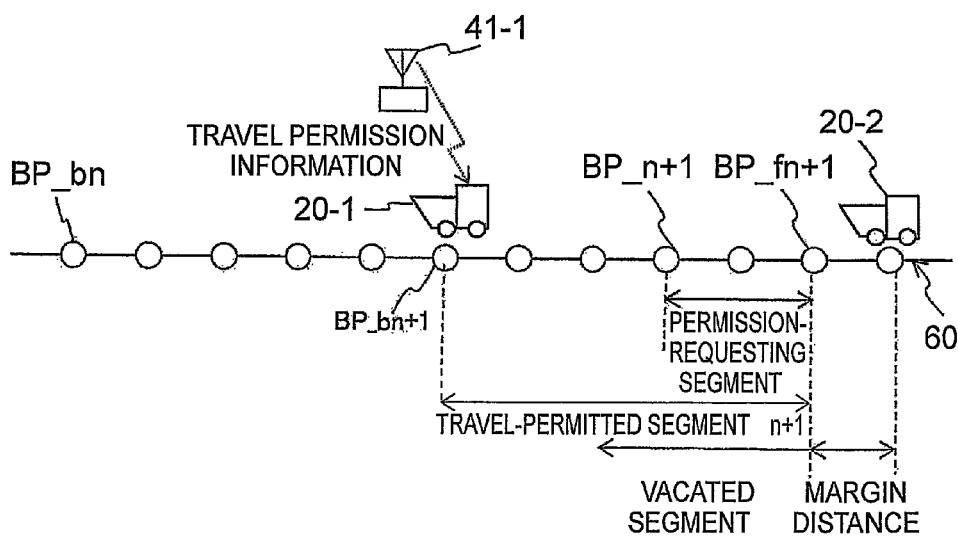

Referring to FIGS. 6A and 6B, a description will be made about the transmission/reception timings of request information and travel permission information. FIGS. 6A and 6B are diagrams depicting the bidirectional mode, in which FIG. 6A depicts the timing of transmission of request information and FIG. 6B depicts a vacated segment.

In FIG. 6A, the horizontal line indicates the travel route 60 along which the dump truck 20-1 is supposed to travel. The travel route 60 is composed of nodes (indicated by ◯ in FIG. 6A), which carry given point coordinates as information, and sublinks connecting the adjacent nodes together. On the travel route 60, segments permitted for the individual dump trucks to travel are called "travel-permitted segments". Each travel-permitted segment is defined including plural nodes and sublinks. In a travel-permitted segment n, the node at a starting point is called "former rear boundary point BP_bn", the node at an ending point is called "front boundary point BP_fn", and a segment, which has returned by a predetermined distance from the front boundary point BP_fn and in which the transmission of request information is to be performed, is called "permission-requesting segment". Further, the rearmost node in the permission-requesting segment is called "permission-requesting point BP_Rn".

When the dump truck 20-1 autonomously travels in the travel-permitted segment n and reaches the permission-requesting point BP_Rn, request information is transmitted from the onboard terminal equipment 26 mounted on the dump truck 20-1.

The dump truck 20-2 is assumed to be traveling immediately ahead of the dump truck 20-1 at this time. This dump truck 20-2 will hereinafter be called "immediately preceding dump truck".

The travel-permitted segment setting unit 311a of the fleet management server 31 vacates the rear apart from a point by a margin distance that has been set in anticipation of a distance needed for the following dump truck, specifically the dump truck 20-1 to stop by relying upon the current position of the immediately preceding dump truck 20-2 as a reference. The segment so vacated is called "vacated segment". In the following description, the expression "vacate the rear" of the dump truck means to vacate the rear apart from a point by the margin distance (see FIG. 6B).

When a new travel-permitted segment can be set in response to request information as depicted in FIG. 6B, the dump truck 20-1 which has transmitted the request information maintains the request information in an attempt to acquire it in the bidirectional mode while continuously traveling.

If a situation that no new travel-permitted segment is allocated to the dump truck 20-1 arises, however, the dump truck 20-1 repeats, in the permission-requesting segment of FIG. 6A, processing that request information is transmitted and travel non-permission information is received from the fleet management server 31. When the dump truck 20-1 eventually reaches the front boundary point BP_fn of the travel-permitted segment n, the dump truck 20-1 stops to avoid a collision against the immediately preceding dump truck. From the onboard terminal equipment 26 mounted on the dump truck 20-1 to the fleet management server 31, stop notice information, which indicates that the dump truck 20-1 has stopped, is transmitted.

Upon reception of the stop notice information, the communication mode determination unit 311b of the fleet management server 31 determines the satisfaction or dissatisfaction of the switching conditions for the operation mode. If satisfied, the communication mode determination unit 311b determines to switch the operation mode from the bidirectional mode to the push mode. In this embodiment, the conditions for switching the operation mode to the push mode (hereinafter called "the operation mode switching conditions") are supposed to satisfy all the following items, items (1), (2) and (3), at the same time.

(1) The own vehicle is at stop.
(2) The dump truck immediately preceding the own vehicle is at stop.
(3) A segment long enough to be allocated as a travel-permitted segment is not left between the own vehicle and the immediately preceding dump truck.

Assuming the own vehicle as the dump truck 20-1 and the immediately preceding dump truck as the dump truck 20-2 in the example of FIGS. 6A and 6B. The communication mode determination unit 311b determines to switch the operation mode from the bidirectional mode to the push mode when the dump truck 20-1 is at stop (the item (1) is satisfied), the dump truck 20-2 is at stop (the item (2) is satisfied), and there is only a margin distance left between a travel-permitted segment set for the dump truck 20-1 and a travel-permitted segment set for the dump truck 20-2 (the item (3) is satisfied), the communication mode determination unit 311b determines to switch the operation mode from the bidirectional mode to the push mode.

In the following description, the state that the items (1) to (3) are all satisfied at the same time is called "congestion state", while the state that any one or more of the items (1) to (3) are dissatisfied is called "normal travel state". In this embodiment, the fleet management server 31 and the onboard terminal equipment 26 mounted on the individual dump trucks perform communications in the push mode in the congestion state, but in the bidirectional mode under the normal travel state.

Figure 7:
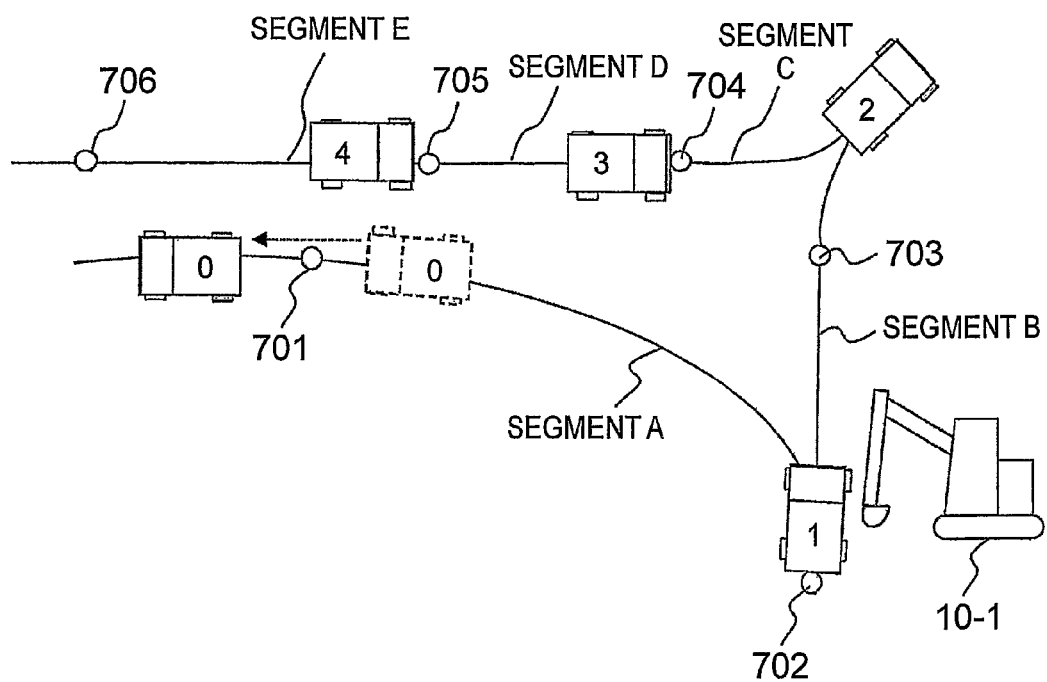
FIG. 7 is a diagram exemplifying travel states of dump trucks at a particular point in time.
Figure 8A:
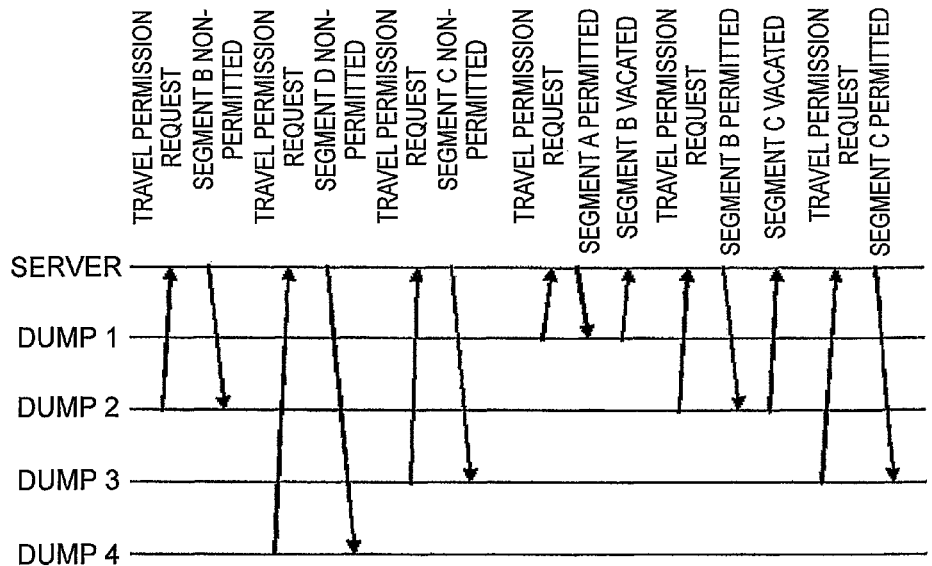
Figure 8B:
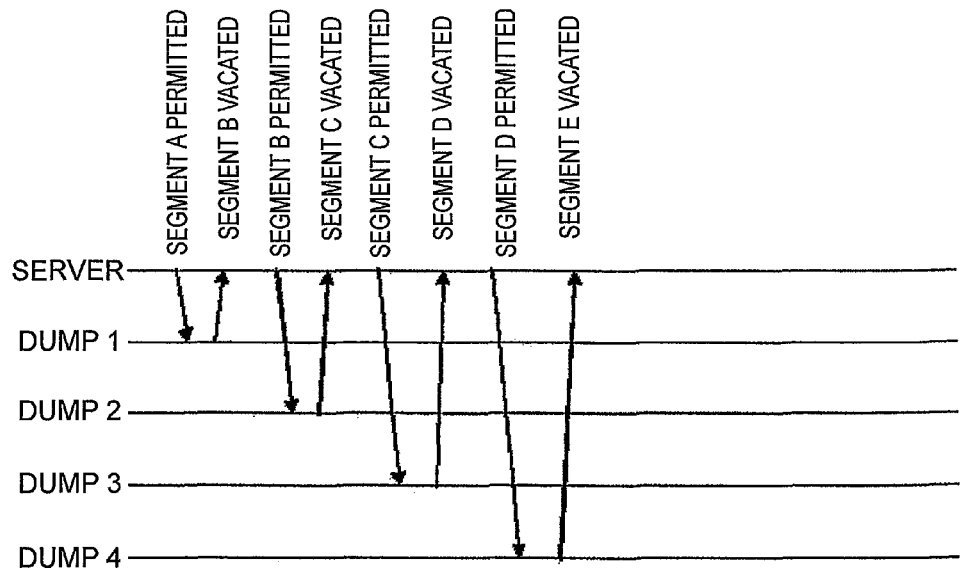

With reference to FIG. 7 and FIGS. 8A and 8B, a description will be made about the bidirectional mode and push mode. FIG. 7 is a diagram exemplifying travel states of dump trucks at a particular point in time. FIGS. 8A and 8B are diagrams illustrating the amount of communications in the bidirectional mode and that in the push mode in comparison to each other, in which FIG. 8A illustrates the amount of communications when transmitted in the bidirectional mode under a congestion state, and FIG. 8B illustrates the amount of communications when transmitted in the bidirectional mode under a congestion state.

FIG. 7 illustrates the travel states of the dump trucks around a loading site where the excavator 10-1 is performing digging work and loading work onto one of the dump trucks. Each dump truck waits before the loading site until the entrance to the loading site is permitted. At this time, a queue may be formed. Upon completion of loading work at the loading site, each dump truck on which rock dug by the excavator 10-1 is loaded starts out for an unillustrated dumping site. In FIG. 7, these dump trucks are illustrated taking, as an example, dump trucks to which numerals of 0, 1, 2, 3 and 4 have been assigned, respectively, as dump truck ID. For the dump truck 0 in the figure, the segment from the nodes 701 to 702 is allocated as a travel-permitted segment A. Similarly allocated are the segment from the nodes 702 to 703 as a travel-permitted segment B for the dump truck 1, the segment from the nodes 703 to 704 as a travel-permitted segment C for the dump truck 2, the segment from the nodes 704 to 705 as a travel-permitted segment D for the dump truck 3, and the segment from the nodes 705 to 706 as a travel-permitted segment E for the dump truck 4.

The dump truck 0 is illustrated in a state of traveling and having exited from the travel-permitted segment A. Further, the dump trucks 1,2,3 are assumed to be at stop at the front boundary points of the travel-permitted segments allocated to the respective dump trucks. The dump truck 4 is assumed to be traveling in the travel-permitted segment E.

When the fleet management server 31 does not perform fleet management and all the dump trucks conduct wireless communications in the bidirectional mode with the fleet management server 31, the dump trucks 2,3,4 are at stop but transmit request information at desired timings, as illustrated in FIG. 8A. Because the individual dump trucks transmit the request information at this time irrespective of whether or not their front segments are unoccupied, response information composed of travel non-permission information as its contents is transmitted from the fleet management server 31 to the individual dump trucks when the front segments are not unoccupied. The communications that have been generated at this time, therefore, result in useless communications, so that a need arises to transmit request information again after the elapse of a given period of time.

When the fleet management server 31 performs fleet management and sets the operation mode of the segment setting processing for each of dump trucks, which have been determined to be under a congestion state, to the push mode, travel permission information is transmitted from the fleet management server 31 to the following dump trucks at a timing set to the timing that the vacation of each segment occurs from the front of a queue. In this manner, it is possible to reduce the time until the clearance of the congestion, and at the same time, to reduce the amount of communications owing to the elimination of useless communications.

Referring to FIG. 9, a description will be made about a fleet management information table. FIG. 9 is a fleet management information table illustrating the travel states of the dump trucks 1,2,3,4 in FIG. 7.

As illustrated in FIG. 9, the fleet management information table is configured including a "dump truck identification information" record 901 for specifically identifying the dump trucks, a "front boundary point" record 902 and "rear boundary point" record 903 of the respective travel-permitted segments as information for defining the travel-permitted segments, and a "congestion stop" record 904 indicating whether the respective dump trucks are traveling or at stop, and a "congestion flag" record 905 indicating whether or not the travel-permitted segments, in which the respective dump trucks are present, are in a congestion state.

The travel-permitted segment setting unit 311a updates the "dump identification information" record 901, "front boundary point" record 902 and "rear boundary point" record 903 whenever a travel-permitted segment is newly set.

Each stop flag stored in the "stop flag" record 904 distinguishes whether the dump truck which is present in the corresponding travel-permitted segment is currently in a travel state (R) or in a stop state (S). Referring to the travel state or the stop state shown in the travel state information 502c of the request information format 500 as received from each dump truck, the travel-permitted segment setting unit 311a writes a value "1" on the "stop flag" record 904 if the dump truck is at stop, or a value "0" on the "stop flag" record 904 if the dump truck is traveling.

Each congestion flag stored in the "congestion flag" record 905 is used upon determination of the operation mode of the segment setting processing of the corresponding dump truck, and the operation mode determination unit 311b writes the value "1" on the "congestion flag" record 905 when the state of the dump truck subjected to the determination of its operation mode is determined to satisfy the operation mode switching conditions. If the operation mode determination unit 311b determines that the state of the dump truck subjected to the determination of its operation mode does not satisfy one or more of the operation mode switching conditions, the operation mode determination unit 311b writes the value "0" on the "congestion flag" record 905. The fleet management information table according to this embodiment is also equipped with a function as an operation mode management table because the information on the results of determination of the operation mode by the operation mode determination unit 311b is written as a congestion flag.

Figure 10:
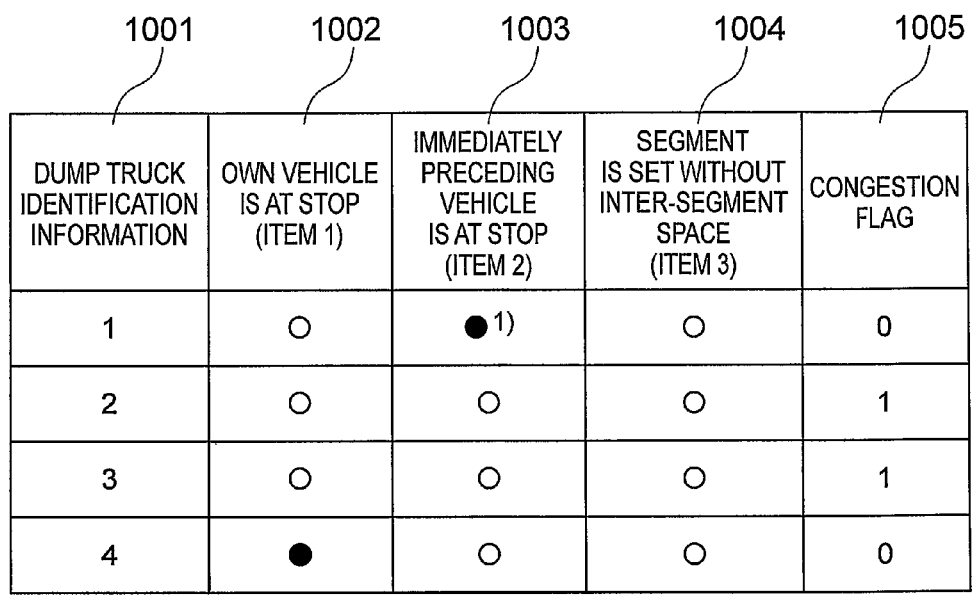
FIG. 10 is a diagram illustrating processing that an operation mode determination unit performs the determination of satisfaction of operation mode switching conditions with reference to the fleet management information table of FIG. 9.

In the fleet management information table of FIG. 9, the front boundary point of the travel-permitted segment B in which the dump truck 1 is present is in registration with the rear boundary point of the travel-permitted segment A in which the dump truck 0 is present (see FIG. 7). Therefore, the travel-permitted segment A and the travel-permitted segment B are set without any inter-segment space. Similarly, the front boundary point of the travel-permitted segment C in which the dump truck 2 is present is in registration with the rear boundary point of the travel-permitted segment B, the front boundary point of the travel-permitted segment D in which the dump truck 3 is present is in registration with the rear boundary point of the travel-permitted segment C, and the front boundary point of the travel-permitted segment E in which the dump truck 4 is present is in registration with the rear boundary point of the travel-permitted segment D. In the fleet management information table of FIG. 9, the travel-permitted segments for the dump trucks 1 to the dump trucks 4 are hence allocated with no inter-segment space (the item (3) of the above-described switching conditions is satisfied). Under this premise, the operation mode determination processing by the operation mode determination unit 311b will be described with reference to FIG. 10. FIG. 10 is a diagram illustrating the processing that the operation mode determination unit 311b performs the determination of satisfaction of the operation mode switching conditions with reference to the fleet management information table of FIG. 9.

FIG. 10 contains dump truck identification information in a "dump truck identification information" record 1001 (which corresponds to the "dump truck identification information" record 901 in FIG. 9). In FIG. 10, ○ represents the satisfaction of the respective items, which make up the operation mode switching conditions, for the dump trucks specified by the dump truck identification information and the travel-permitted segments to which the dump trucks belong, while ● represents the dissatisfaction of one or more of the respective items. A record 1002, "own vehicle at stop (Item 1)", in FIG. 10 is one prepared by substituting ● for the value 0 and ○ for the value 1 of each dump truck in the "stop flag" record 904 in FIG. 9.

A record 1003, "immediately preceding dump truck at stop (Item 2)", in FIG. 10 is one prepared by substituting ● for the value 1 and ○ for the value 0 of the dump truck located immediately ahead of each dump truck, for example, the dump truck 1 with respect to the dump truck 2 in the "stop flag" record 904 in FIG. 9.

As the satisfaction/dissatisfaction in a record 1004, "segments are set without any inter-segment space (Item 3)", in FIG. 10, ○ represents the presence of no inter-segment space, while ● represents the presence of an inter-segment space. ○ is filled for all the dump trucks because no inter-segment space is present between the travel-permitted segments A, B, C, D, E as mentioned above.

The operation mode determination unit 311b fills, as the value of the congestion flag, "1" for every dump identification information having ○ with respect to all the three items, or otherwise the value "0". The fleet management information table of FIG. 9 is stored in the fleet management information DB 317 and is updated as needed, while the table of FIG. 10 is illustrated merely for describing the details of the determination processing at the operation mode determination unit 311b and has no need to be stored as a table in the fleet management server 31. The operation mode determination unit 311b is simply required to determine the value of the congestion flag by logically performing the processing described in this table.

Figure 11:
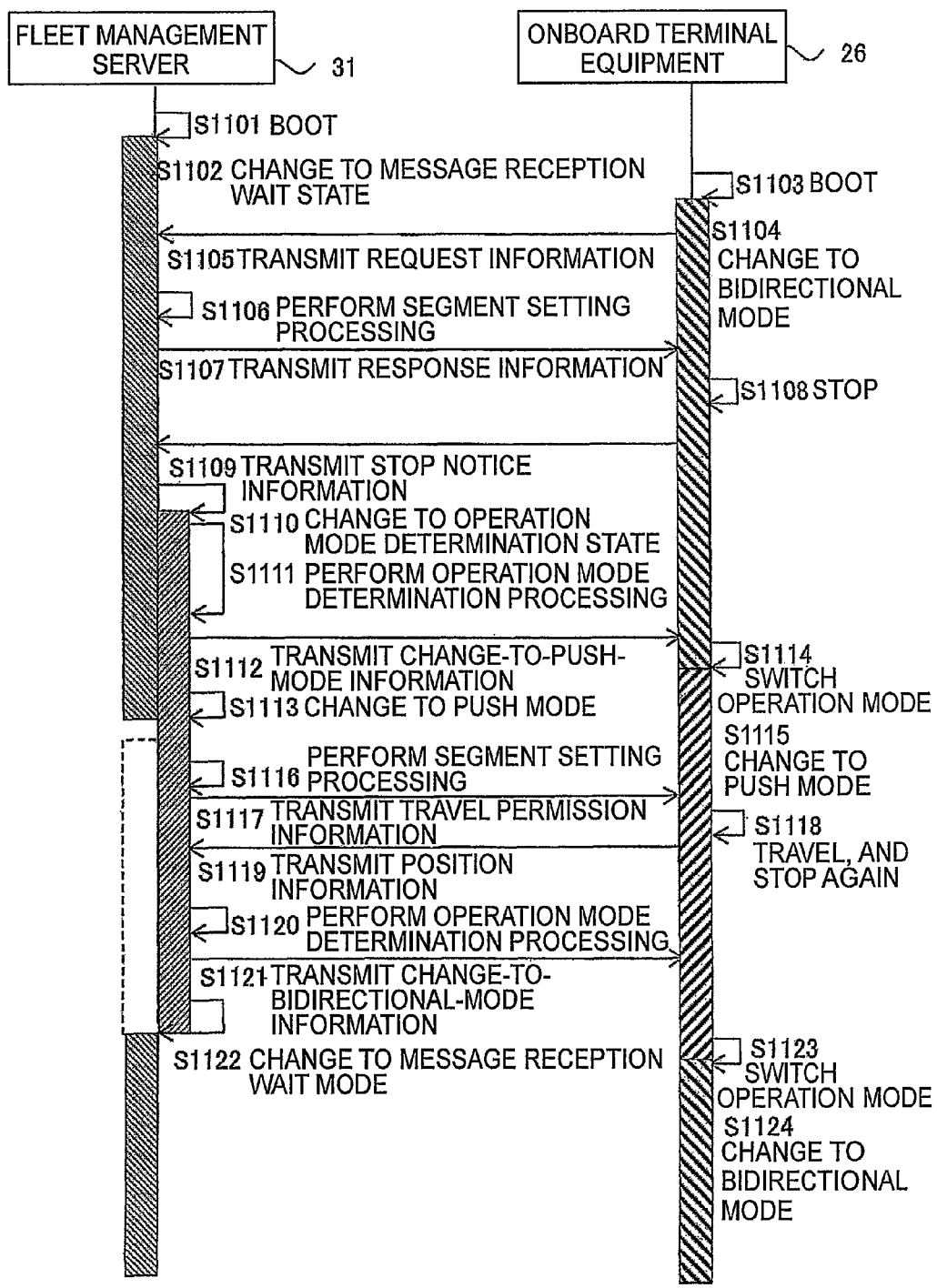
FIG. 11 is a state transition diagram of the fleet management server and onboard terminal equipment.

With reference to FIG. 11, a description will be made about state transitions of the fleet management server and onboard terminal equipment. FIG. 11 is a state transition diagram of the fleet management server and onboard terminal equipment.

When booted by turning on a main power supply (S1101), the fleet management server 31 changes to a state waiting for the reception of a message from the onboard terminal equipment 26 (S1102). In FIG. 11, this message reception wait state is indicated by a block with left-to-right hatching along the line of the fleet management server 31.

When booted by turning on a main power supply (S1103), the onboard terminal equipment 26 enters the bidirectional mode (normal travel state) as an initial default state after booting (S1104). In FIG. 11, the bidirectional mode is indicated by a block with left-to-right downward hatching along the line of the onboard terminal equipment 26.

In the bidirectional mode (normal travel state), request information is transmitted from the request information processing unit 261d of the onboard terminal equipment 26 to the fleet management server 31 (S1105). When the fleet management server 31 receives the request information, the travel-permitted segment setting unit 311a performs setting processing of a new travel-permitted segment (S1106). The travel-permitted segment setting unit 311a transmits travel permission information, which indicates the new travel-permitted segment, upon completion of the setting of the travel-permitted segment, but transmits travel non-permission information when the setting of the travel-permitted segment is not feasible (S1107). The travel permission information or travel non-permission information, which is produced and transmitted in response to the request information, corresponds to the response information.

Upon reception of the response information, the dump truck 20-1 starts and continues traveling, or stops. When the dump truck 20-1 stops during the bidirectional mode (normal travel state) (S1108), stop notice information is transmitted from the travel control unit 261a of the onboard terminal equipment 26 to the fleet management server 31 (S1109).

Upon reception of the stop notice information, the fleet management server 31 changes to the operation mode determination state (S1110). More specifically, the operation mode determination processing by the operation mode determination unit 311b is started (S1111). The fleet management server 31 enters a state in which the message reception wait state and the operation mode determination state are present together. In FIG. 11, the operation mode determination processing is indicated by a block with right-to-left downward hatching along the line of the fleet management server 31.

When the operation mode determination unit 311b determines to maintain the normal travel state, in other words, the bidirectional mode as a result of the operation mode determination processing, the transmission of a message to the onboard terminal equipment 26 is not performed. When no switch-to-push-mode information is received from the fleet management server 31 despite the elapse of a predetermined time from the transmission of stop notice information, the onboard terminal equipment 26 waits still in the bidirectional mode. In this case, the onboard terminal equipment 26 performs the transmission of request information again.

When the operation mode determination unit 311b determines a congestion state, in other words, to switch to the push mode as a result of the operation mode determination processing, switch-to-push-mode information is transmitted to the onboard terminal equipment 26 (S1112). At the same time, the operation mode switching unit 311c switches the setting of the operation mode of the travel-permitted segment setting unit 311a to the push mode (S1113). As a result, the message reception wait state of the fleet management server 31 is canceled.

When the onboard terminal equipment 26 receives the switch-to-push-mode information, a terminal-side communication control unit 261b causes the request information processing unit 261d to stop the transmission of request information, and at the same time, causes the terminal-side communication control unit 261b to perform the change of the setting of the operation mode from the bidirectional mode to the push mode (S1114). As a result, the onboard terminal equipment 26 changes to the push mode, and waits for the reception of travel permission information (S1115). In FIG. 11, the push mode of the onboard terminal equipment 26 is indicated by a block with right-to-left downward hatching along the line of the onboard terminal equipment 26.

The fleet management server 31 also performs segment setting processing during the push mode (congestion state). Upon completion of the setting of a travel-permitted segment, the travel-permitted segment setting unit 311a transmits travel permission information to the onboard terminal equipment 26 (S1117).

Upon reception of the travel permission information, the onboard terminal equipment 26 travels through congestion and stops again (S1118), and transmits position information to the fleet management server 31 (S1119).

The operation mode determination unit 311b continues the operation mode determination state (S1120). When the operation mode determination unit 311b then determines that the congestion has cleared and the operation mode should be switched to the bidirectional mode, the fleet management server 31 transmits switch-to-bidirectional-mode information to the onboard terminal equipment 26 (S1121). At the same time, the operation mode switching unit 311c causes the server-side communication control unit 311d to switch the setting of the operation mode to the bidirectional mode, and the fleet management server 31 changes from the operation mode determination state to a message reception wait state (S1122).

Upon reception of the switch-to-bidirectional-mode information, the onboard terminal equipment 26 switches the operation mode from the push mode to the bidirectional mode (S1123), and changes to the bidirectional mode again (S1124).

Figure 12:
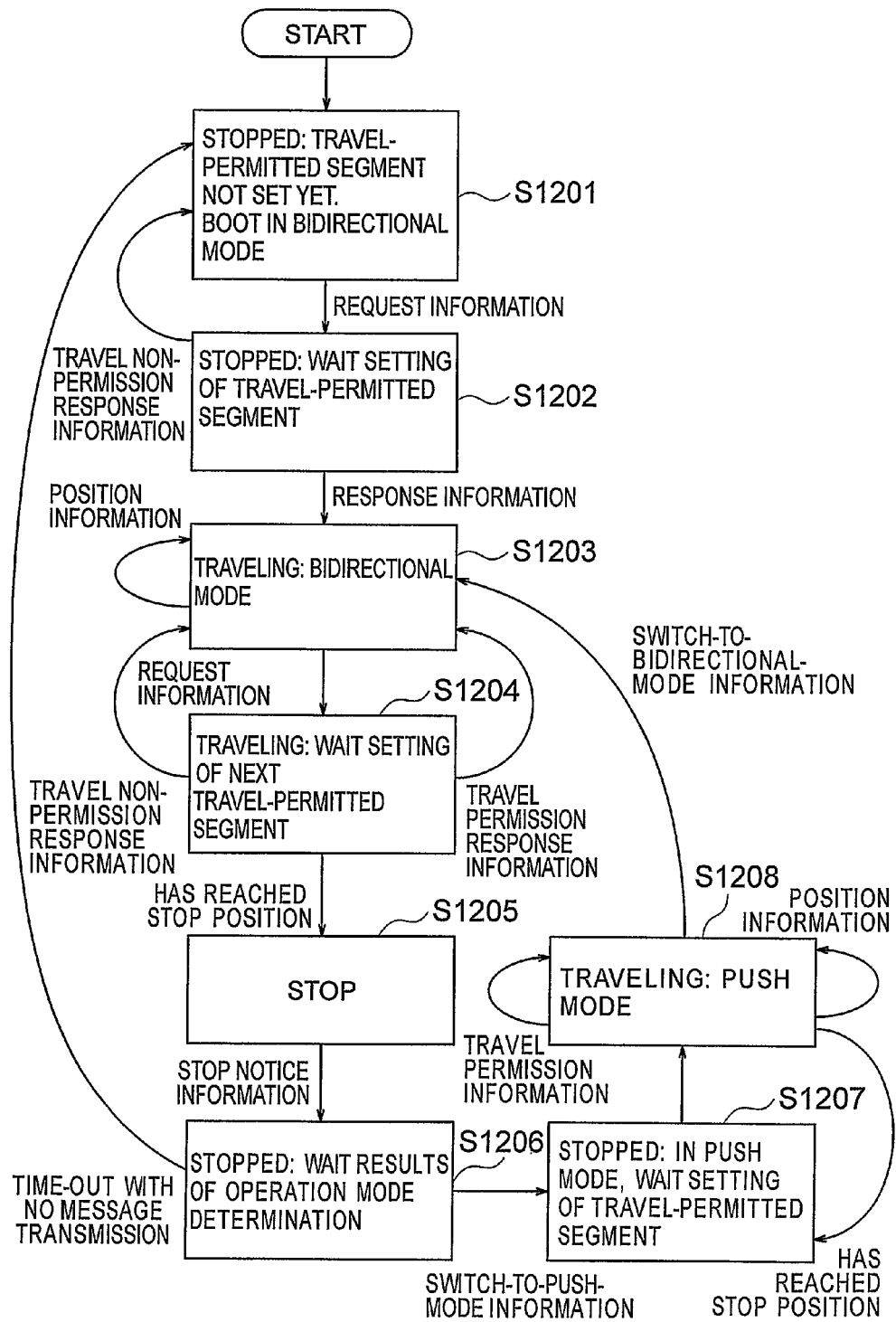
FIG. 12 is a state transition diagram of the dump truck on which the onboard terminal equipment shown in FIG. 11 is mounted.

Referring to FIG. 12, the state transitions in FIG. 11 of the dump truck with the onboard terminal equipment mounted thereon will be described in detail together with the travel states. FIG. 12 is a state transition diagram of the dump truck.

After the onboard terminal equipment 26 mounted on the dump truck 20-1 is booted (this corresponds to S1103 in FIG. 11), its initial default state after the booting changes to the bidirectional mode (this corresponds to S1104 in FIG. 11). Shortly after the booting and the switch to the bidirectional mode, the dump truck 20-1 is in a state that it is at stop and its travel-permitted segment has not been set yet (S1201).

The request information transmitting unit 261 of the onboard terminal equipment 26 transmits request information to the fleet management server 31 during the stop in order to request the setting of a travel-permitted segment (this corresponds to S1105 in FIG. 11), and waits for the setting of a travel-permitted segment (S1202). When the onboard terminal equipment 26 receives travel non-permission information from the fleet management server 31, the processing returns to step S1101, and after the elapse of a predetermined time, the request information transmitting unit 261 repeats the transmission of the request information.

When the onboard terminal equipment 26 receives response information (travel permission information) (this corresponds to S1107 in FIG. 11), the dump truck 20-1 performs autonomous traveling according to the travel permission information (S1203). Step S1203 corresponds to a normal travel state because the dump truck 20-1 is in a state of performing traveling by conducting the reception of the response information. Further, the operation mode of the fleet management server 31 and onboard terminal equipment 26 in S1203 corresponds to the bidirectional mode because the transmission and reception of the response information are conducted. The dump truck 20-1 is always in recognition of its own position by sensors such as GPS. After the dump truck 20-1 has finished traveling through a predetermined segment, it continues autonomous traveling while transmitting position information to the fleet management server 31. Upon reception of the position information, the fleet management server 31 vacates the rear from the position.

At the point of time that the dump truck 20-1 has reached the permission-requesting point (BP_Rn in FIG. 6A) illustrated in FIG. 6A, the onboard terminal equipment 26 transmits request information to request a next travel-permitted section, and changes to a setting state of the next travel-permitted section (S1204). If travel non-permission information is received, the onboard terminal equipment 26 repeatedly transmits request information until travel permission information can be received.

Upon reception of the travel permission information, the onboard terminal equipment 26 updates the information on new travel-permitted segment, and as a result, the dump truck 20-1 continuous autonomous traveling (this corresponds to S1108 in FIG. 11).

If the dump truck 20-1 reaches a stop position while being still unable to obtain the setting of a new travel-permitted segment, the dump truck stops (S1205). The onboard terminal equipment 26 transmits stop notice information to the fleet management server 31 (this corresponds to S1109 in FIG. 11), and waits for the results of determination of the operation mode by the fleet management server 31 (S1206).

On the other hand, the fleet management server 31 which has received the stop notice information changes to an operation mode determination state (this corresponds to S1110 in FIG. 11), and starts operation mode determination processing (this corresponds to S1111 in FIG. 11).

When the operation mode determination unit 311b determines to switch to the push mode (determines a congestion state), switch to-push-mode information is transmitted from the operation mode changing unit 311c to the onboard terminal equipment 26 (this corresponds to S1112). Upon reception of the switch to-push-mode information, the onboard terminal equipment 26 changes the operation mode to the push mode (this corresponds to S1115 in FIG. 11). Subsequently, the onboard terminal equipment 26 changes to the push mode, specifically described, to a state in which without transmission of request information by itself and until the operation mode subsequently transits to the bidirectional mode again, it waits that travel permission information is transmitted from the fleet management server 31 and a travel-permitted segment is set (S1207). When the onboard terminal equipment 26 receives the travel permission information, the dump truck 20-1 travels according to the travel permission information while maintaining the state of the push mode, and stops again (this corresponds to S1118 in FIG. 11, S1208). After the traveling, the onboard terminal equipment 26 performs the transmission of position information to the fleet management server 31. Subsequently, the onboard terminal equipment 26 waits for the reception of next travel permission information.

When the operation mode determination unit 311b of the fleet management server 31 determines to switch from the push mode to the bidirectional mode (determines that the congestion has cleared), switch-to-bidirectional-mode information is transmitted to the onboard terminal equipment 26 (this corresponds to S1121 in FIG. 11). Upon reception of the switch-to-bidirectional-mode information, the onboard terminal equipment 26 switches the operation mode (this corresponds to S1123 in FIG. 11), and changes to the bidirectional mode (this corresponds to S1124 in FIG. 11, S1203).

Figure 13:
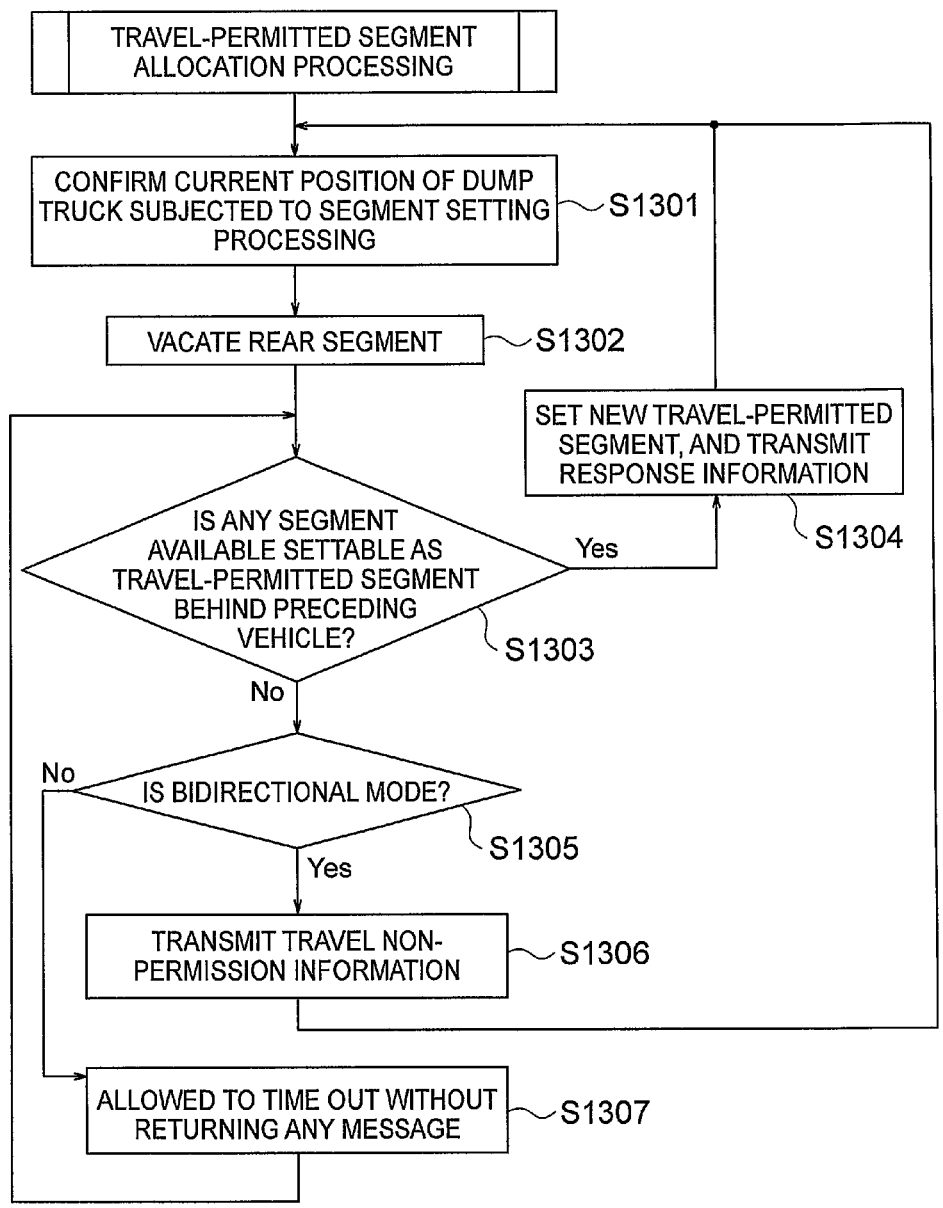
FIG. 13 illustrates a detailed processing flow of segment setting processing.

Referring next to FIG. 13, a description will be made about the segment setting processing in FIG. 11 and FIG. 12. FIG. 13 illustrates a detailed processing flow of the segment setting processing.

As illustrated in FIG. 13, the travel-permitted segment setting unit 311a of the fleet management server 31 confirms the current position of the dump truck subjected to segment setting processing (hereinafter called "the subject dump truck") (S1301). If the subject dump truck is in the bidirectional mode, the current position is ascertained by referring to position information that is contained in request information transmitted from the dump truck. If the subject dump truck is in the push mode, the current position is ascertained with reference to the position information transmitted from the dump truck.

Using as a reference a segment rearward of the current position of the subject dump truck, more specifically a point apart from the current position by a margin distance to secure a distance needed for the following dump truck to stop, the travel-permitted segment setting unit 311a vacates the segment rearward of this reference point such that it can be set as a travel-permitted segment for the other dump truck (S1302).

The travel-permitted segment setting unit 311a then confirms whether or not any segment (distance) which enables to set a new travel-permitted segment is left between the subject dump truck as a reference and the immediately preceding dump truck closest to and ahead of the subject dump truck. If there is a segment which enables such setting (S1303/Yes), the travel-permitted segment setting unit 311a sets a new travel-permitted segment, and transmits response information (travel permission information) (S1304). Subsequently, the processing returns to step S1301.

If there is not any segment that enables such setting (S1303/No) and the subject dump truck is in the bidirectional mode (S1305/Yes), the travel-permitted segment setting unit 311a transmits travel non-permission information to the subject dump truck (S1306), and the processing returns to step S1301.

If there is not any segment that enables such setting (S1303/No) and the subject dump truck is not in the bidirectional mode, in other words, is in the push mode (S1305/No), the travel-permitted segment setting unit 311a transmits no message to the subject dump truck. When a predetermined time elapses in this state (a time-out occurs) (S1307), the processing returns to step S1303 and the subject dump truck waits until a segment, which enables such setting, becomes available between itself and the preceding vehicle.

Referring next to FIG. 14, a description will be made about the operation mode determination processing in FIG. 11. FIG. 14 is a flow chart illustrating a detailed flow of the operation mode determination processing.

Upon reception of stop notice information, the operation mode determination unit 311b of the fleet management server 31 sets a stop flag on a dump truck identification information record, which corresponds to the source dump truck of the stop notice information, in the fleet management table (S1401).

The operation mode determination unit 311b then determines whether or not there is an inter-segment space (a distance settable as a travel-permitted segment) between another travel-permitted forward segment currently set for the source dump truck and a travel-permitted segment set for the dump truck closest to and preceding of the source dump truck as a reference (S1402). If there is such an inter-segment space (S1402/Yes), the operation mode determination unit 311b confirms if a stop flag is set on the immediately preceding dump truck (S1403).

If the stop flag has been also set on the preceding vehicle (S1403/Yes), the operation mode determination unit 311b determines the push mode (a congestion state), and sets a congestion flag on the record, which corresponds to the source dump truck, in the fleet management table (S1404).

If the source dump truck is in the bidirectional mode (S1405/Yes), the operation mode switching unit 311c instructs the travel-permitted segment setting unit 311a to set switching to the push mode and also to transmit switch-to-push-mode information to the source dump truck (S1406) when the congestion flag in the fleet management table is updated.

If the source dump truck is not in the bidirectional mode, that is, is in the push mode (S1405/No), the operation mode processing is ended without any further step because the results of the determination in step S1404 and the current operation mode of the source dump truck coincide with each other.

If there is no inter-segment space behind the travel-permitted segment set for the immediately preceding dump truck (S1402/Yes) and if no stop flag is set on the immediately preceding truck (S1403/No), the operation mode determination unit 311b determines the bidirectional mode (a normal travel state) and, if a congestion flag has been set on the record corresponding to the source dump truck in the fleet management table, deletes the congestion flag (S1407).

When the source dump truck is in the push mode (S1408/Yes), the operation mode switching unit 311c instructs the travel-permitted segment setting unit 311a to set switching to the bidirectional mode and also to transmit switch-to-bidirectional-mode information to the source dump truck (S1409) when the congestion flag in the fleet management table is deleted.

If the source dump truck is not in the push mode, that is, is in the bidirectional mode (S1408/No), the operation mode processing is ended without any further step because the results of the determination in step S1407 and the current operation mode of the source dump truck coincide with each other.

By the above-described processing, the fleet management server determines whether or not congestion has occurred and, if it is in congestion, can switch from the bidirectional mode to the push mode. This can prevent the amount of communications from increasing due to transmission of request information despite dump trucks cannot move forward by the congestion, and further, the processing load on the fleet management server from increasing for responding to such request information. In addition, in the case of the bidirectional mode, segment setting processing is not performed until request information is transmitted even when congestion has already cleared, so that a time lag as much as a waiting time for the transmission of request information occurs until each dump truck from a queue of congestion. In the push mode, on the other hand, the fleet management server detects that congestion has cleared, and shortly after the detection, transmits travel permission information to each dump truck that has waited for congestion to clear. This can reduce the occurrence of such a time lag as described above, and can also shorten the time until the clearance of congestion.

The foregoing description merely illustrates only one embodiment of the present invention, so that a variety of modified embodiments may be contemplated. In the foregoing, the description was made taking autonomous traveling dump trucks as examples of haulage vehicles, but the present invention can also be applied to manned dump trucks on which operators ride.

The invention claimed is:

1. A fleet management server connected, via a wireless communication network, to onboard terminal equipment mounted, respectively, on a plurality of haulage vehicles, which travel along a predetermined travel route in a mine, to perform fleet management of the plurality of haulage vehicles, comprising:
   a control system connected to a wireless communication system configured to perform wireless communications with the individual onboard terminal equipment, and including a central processing unit coupled to a memory; and
   a storage device, coupled to the central processing unit, configured to store map information of the travel route,
   wherein the memory stores instructions, that when executed by the central processing unit, cause the central processing unit to:
   receive position information of a subject vehicle of the plurality of haulage vehicles and position information of an immediately preceding vehicle, which is on the travel route immediately ahead of the subject vehicle, transmitted from the wireless communication system, and read the map information from the map information storage device, set a front boundary point on the travel route at a position that is behind the immediately preceding vehicle, and a rear boundary point on the travel route that is closer to the subject vehicle than a point at a predetermined margin distance from a following vehicle on the travel route, which is a distance needed for the following vehicle to stop, perform segment setting processing for setting segments on the travel route from the rear boundary point to the front boundary point as travel-permitted segments, in which only the subject vehicle is permitted to travel, receive travel state information which identifies whether the subject vehicle is traveling or at stop from the wireless communication system to determine whether or not the subject vehicle is travelling or at stop, when the control system determines that the subject vehicle is traveling, the control system operates in a bidirectional mode in which, in response to the received request information transmitted from the subject vehicle that indicates a request for setting of the travel-permitted segment, performs the segment setting processing, and transmits a result of the segment setting processing, and when the control system determines that the subject vehicle is at a stop, the control system is switched to be operated in a push mode, in which the control system performs the segment setting processing with respect to the subject vehicle without receiving the request information to set a new travel-permitted segment and travel permission information indicating the new travel-permitted segment is produced and transmitted.

2. The fleet management server according to claim 1, wherein the memory further stores instructions causing the central processing unit to: upon switching from the bidirectional mode to the push mode, transmit transmission stop instructions with respect to the request information to the onboard terminal equipment mounted on the subject vehicle and start the performance of the segment setting processing with respect to the subject vehicle, and upon switching from the push mode to the bidirectional mode, transmit transmission stop cancellation instructions with respect to the request information to the onboard terminal equipment mounted on the subject vehicle and start the performance of the segment setting processing with respect to the subject vehicle after reception of the request information from the subject vehicle.

3. The fleet management server according to claim 1, wherein the memory further stores instructions causing the central processing unit to: determine switching of the operation mode from the bidirectional mode to the push mode when among the plurality of the haulage vehicles, the subject vehicle and the immediately preceding vehicle located immediately ahead of the subject vehicle are both at stop and a travel-permitted segment set for the subject vehicle and another travel-permitted segment set for the immediately preceding haulage vehicle are adjacent to each other.

4. The fleet management server according to claim 3, wherein the memory further stores instructions causing the central processing unit to: determine switching of the operation mode of the segment setting processing for the subject vehicle from the push mode to the bidirectional mode when the immediately preceding haulage vehicle has started traveling while the subject vehicle has been set in the push mode and is traveling or when a distance, which enables to set a new travel-permitted segment between the travel-permitted segment set for the subject vehicle and the travel-permitted segment set for the immediately preceding haulage vehicle, has arisen while the subject vehicle has been set in the push mode and is traveling.

5. The fleet management server according to claim 1, wherein the memory further stores instructions causing the central processing unit to: produce operation mode management information with determination result information, which indicates results of the determination with respect to each of the plurality of haulage vehicles, being stored therein in association with haulage vehicle identification information that specifically identify the individual haulage vehicles, and perform the switching processing of the operation mode with reference to the operation mode management information.

6. An onboard terminal equipment connected, via a wireless communication network, to a fleet management server configured to perform fleet management processing for a plurality of haulage vehicles which travel along a predetermined travel route in a mine, and perform segment setting processing for setting segments on the travel route in which a vehicle is permitted to travel, comprising:

a terminal communication control unit, coupled to the wireless communication network, configured to perform control of wireless communications to be conducted with the fleet management server, coupled to a central processing unit, wherein the central processing unit is coupled to a memory that stores instructions, that when executed by the central processing unit, causes the central processing unit to:

receive a result of the segment setting processing in a bidirectional mode or a push mode, transmit a request for setting of a travel-permitted segment as a segment in the travel route, in which traveling of the haulage vehicle with the onboard terminal equipment mounted thereon is permitted, in the bidirectional mode, in which the fleet management server performs the segment setting processing in response to receiving the request for setting of the travel-permitted segment, stop transmission of the request for setting of the travel-permitted segment when the terminal communication control unit receives transmission stop instructions with respect to the request from the fleet management server, start transmission of the request for setting of the travel-permitted segment when the terminal communication control unit receives instructions to cancel the transmission stop instructions with respect to the request from the fleet management server, in the push mode, receive via the terminal communication control unit, the result of the segment setting processing without transmitting the request for setting of the travel-permitted segment, and instruct the haulage vehicle to travel along the travel route in accordance with the result of the segment setting processing.

7. A fleet management system including a fleet management server configured to perform fleet management of a plurality of haulage vehicles, which travel along a predetermined travel route in a mine, and onboard terminal equipment connected, via a wireless communication network, to the fleet management server and mounted respectively on the plurality of haulage vehicles, wherein:

the fleet management server comprises:
- a control system connected to a wireless communication system configured to perform wireless communications with the individual onboard terminal equipment, and including a memory coupled to a central processing unit; and
- a storage device, coupled to the central processing unit, configured to store map information of the travel route, wherein the memory stores instructions, that when executed by the central processing unit, cause the central processing unit to:

receive position information of a subject vehicle of the plurality of haulage vehicles and position information of an immediately preceding vehicle, which is on the travel route immediately ahead of the subject vehicle, transmitted from the wireless communication system, read the map information from the map information storage device, set a front boundary point on the travel route at a position that is behind the immediately preceding vehicle, and a rear boundary point on the travel route that is closer to the subject vehicle than a point at a predetermined margin distance from a following vehicle on the travel route, which is a distance needed for the following vehicle to stop, perform segment setting processing for setting segments on the travel route from the rear boundary point to the front boundary point as travel-permitted segments, in which only the subject vehicle is permitted to travel receive travel state information which identifies whether the subject vehicle is traveling or at stop from the wireless communication system to determine whether or not the subject vehicle is travelling or at stop;

when the control system determines that the subject vehicle is traveling, the control system operates in a bidirectional mode in which, in response to the received request information transmitted from the subject vehicle that indicates a request for setting of the travel-permitted segment, performs the segment setting processing, and transmits a result of the segment setting processing, and when the control system determines that the subject vehicle is at a stop, the control system is switched to be operated in a push mode, in which the control system performs the segment setting processing with respect to the subject vehicle without receiving the request information to set a new travel-permitted segment and travel permission information indicating the new travel-permitted segment is produced and transmitted.

8. A method of management a fleet executed by a management server having a control system and connected, via a wireless communication network, to onboard terminal equipment mounted, respectively, on a plurality of haulage vehicles, which travel along a predetermined travel route in a mine, to perform fleet management of the plurality of haulage vehicles, the method comprising:

receiving position information of a subject vehicle of the plurality of haulage vehicles and position information of an immediately preceding vehicle, which is on the travel route immediately ahead of the subject vehicle, transmitted from the wireless communication system, and reading the map information from the map information storage device;

setting a front boundary point on the travel route at a position that is behind the immediately preceding vehicle, and a rear boundary point on the travel route that is closer to the subject vehicle than a point at a predetermined margin distance from a following vehicle on the travel route, which is a distance needed for the following vehicle to stop;

performing segment setting processing for setting segments on the travel route from the rear boundary point to the front boundary point as travel-permitted segments, in which only the subject vehicle is permitted to travel;

receiving travel state information which identifies whether the subject vehicle is traveling or at stop from the wireless communication system to determine whether or not the subject vehicle is travelling or at stop;

when the control system determines that the subject vehicle is traveling, the control system operates in a bidirectional mode in which, in response to the received request information transmitted from the subject vehicle that indicates a request for setting of the travel-permitted segment, performs the segment setting processing, and transmits a result of the segment setting processing; and when the control system determines that the subject vehicle is at a stop, the control system is switched to be operated in a push mode, in which the control system performs the segment setting processing with respect to the subject vehicle without receiving the request information to set a new travel-permitted segment and travel permission information indicating the new travel-permitted segment is produced and transmitted.

* * * * *